(12) United States Patent
Oshima

(10) Patent No.: US 8,243,331 B2
(45) Date of Patent: Aug. 14, 2012

(54) PRINT CONTROL APPARATUS, PRINT CONTROL METHOD AND PRINTER

(75) Inventor: Yasuhiro Oshima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/207,005

(22) Filed: Aug. 10, 2011

(65) Prior Publication Data

US 2011/0292423 A1 Dec. 1, 2011

Related U.S. Application Data

(63) Continuation of application No. 12/698,753, filed on Feb. 2, 2010, which is a continuation of application No. 11/303,954, filed on Dec. 19, 2005, now Pat. No. 7,760,373.

(30) Foreign Application Priority Data

Dec. 24, 2004 (JP) ................................. 2004-373811

(51) Int. Cl.
G06F 15/00 (2006.01)
(52) U.S. Cl. ........................................... 358/1.9
(58) Field of Classification Search ................... 358/1.9, 358/1.1
See application file for complete search history.

(56) References Cited

U.S. PATENT DOCUMENTS

| 6,667,812 B1 | 12/2003 | Sato et al. |
| 6,678,066 B1 | 1/2004 | Nakamura |
| 6,948,792 B2 | 9/2005 | Narusawa et al. |
| 7,081,970 B2 | 7/2006 | Sato et al. |
| 7,423,782 B2 | 9/2008 | Miyazawa et al. |
| 7,760,373 B2 | 7/2010 | Oshima |
| 2002/0030846 A1* | 3/2002 | Moriyama et al. ........... 358/1.15 |

FOREIGN PATENT DOCUMENTS

| EP | 0 859 326 A2 | 8/1998 |
| EP | 1 081 637 A2 | 3/2001 |
| JP | 6-332635 A | 12/1994 |
| JP | 7-129338 A | 5/1995 |
| JP | 7-223341 A | 8/1995 |
| JP | 8-190464 A | 7/1996 |
| JP | 11-316661 A | 11/1999 |
| JP | 2003-175657 A | 6/2003 |
| JP | 2004-291494 A | 10/2004 |
| JP | 2004-351793 A | 12/2004 |

* cited by examiner

Primary Examiner — Saeid Ebrahimi Dehkordy
(74) Attorney, Agent, or Firm — Sughrue Mion, PLLC

(57) ABSTRACT

A print control apparatus comprising: a first receiving unit that receives, from a printer, support language information indicating whether a particular kind of language is supported by the printer; a judging unit that judges, by referring to the support language information received by the first receiving unit, whether the particular kind of language which is supported by the print control apparatus is supported by the printer; a transmitting unit that transmits, to the printer, a specification information acquisition command for acquiring specification information relating to a specification supported by the printer if the judging unit judges that the particular kind of language is supported by the printer; a second receiving unit that receives the specification information which is transmitted from the printer in response to the specification information acquisition command; and a controller that performs processing according to the specification information received by the second receiving unit.

7 Claims, 20 Drawing Sheets

FIG. 2

| SHEET TYPE | SHEET SIZE | LAYOUT |
|---|---|---|
| PHOTOGRAPHIC SHEET | L-SIZE | ONE SURFACE/BORDERLESS<br>ONE SURFACE/BORDERED |
| | 2L-SIZE | ONE SURFACE/BORDERLESS<br>ONE SURFACE/BORDERED |
| | A4 | ONE SURFACE/BORDERLESS<br>ONE SURFACE/BORDERED |
| GLOSSY SHEET | POSTCARD | ONE SURFACE/BORDERLESS<br>ONE SURFACE/BORDERED |
| | A4 | ONE SURFACE/BORDERLESS<br>ONE SURFACE/BORDERED |
| PHOTOMAT SHEET | A4 | ONE SURFACE/BORDERLESS<br>ONE SURFACE/BORDERED |
| | BUSINESS CARD | ONE SURFACE/BORDERLESS<br>ONE SURFACE/BORDERED |
| GOVERNMENT-PRINTED IJ POSTCARD | POSTCARD | ONE SURFACE/BORDERLESS<br>ONE SURFACE/BORDERED |
| | CARD | ONE SURFACE/BORDERLESS<br>ONE SURFACE/BORDERED |
| PLAIN SHEET | POSTCARD | ONE SURFACE/BORDERLESS<br>ONE SURFACE/BORDERED |
| | A4 | ONE SURFACE/BORDERLESS<br>ONE SURFACE/BORDERED |
| SEAL | SEAL | 16 SURFACES |

FIG. 3

| SHEET TYPE | PRINT QUALITY (RESOLUTION SETTING VALUE) | OUTPUT RESOLUTION (H x V) | BIDIRECTIONAL PRINTING | DOT SIZE |
|---|---|---|---|---|
| PHOTOGRAPHIC SHEET | HIGH | 2880 x 720 | OFF | VSD3 |
| | NORMAL | 1440 x 720 | ON/OFF | VSD3 |
| | DRAFT | 720 x 720 | ON/OFF | VSD2 |
| GLOSSY SHEET | HIGH | 1440 x 720 | OFF | VSD3 |
| | NORMAL | 1440 x 720 | ON/OFF | VSD3 |
| PHOTOMAT SHEET AND GOVERNMENT-PRINTED IJ POSTCARD | HIGH | 1440 x 720 | OFF | VSD3 |
| | NORMAL | 1440 x 720 | ON/OFF | VSD3 |
| | DRAFT | 720 x 720 | ON/OFF | VSD2 |
| PLAIN SHEET | HIGH | 720 x 720 | OFF | VSD2 |
| | NORMAL | 720 x 720 | ON/OFF | VSD2 |
| | DRAFT | 360 x 360 | ON | VSD1 |
| SEAL (GLOSSY FILM) | HIGH | 1440 x 720 | OFF | VSD3 |

| DATA LENGTH | MFG | CMD | ............. |

| SHEET SIZE | PARAMETER-1 | | |
|---|---|---|---|
| S (53h) | xxh | | |
| | SHEET SIZE | PARAMETER-1 | PARAMETER-2 |
| | T (54h) | xxh | yyh |
| | / (2Fh) | | |
| / (2Fh) | | | |

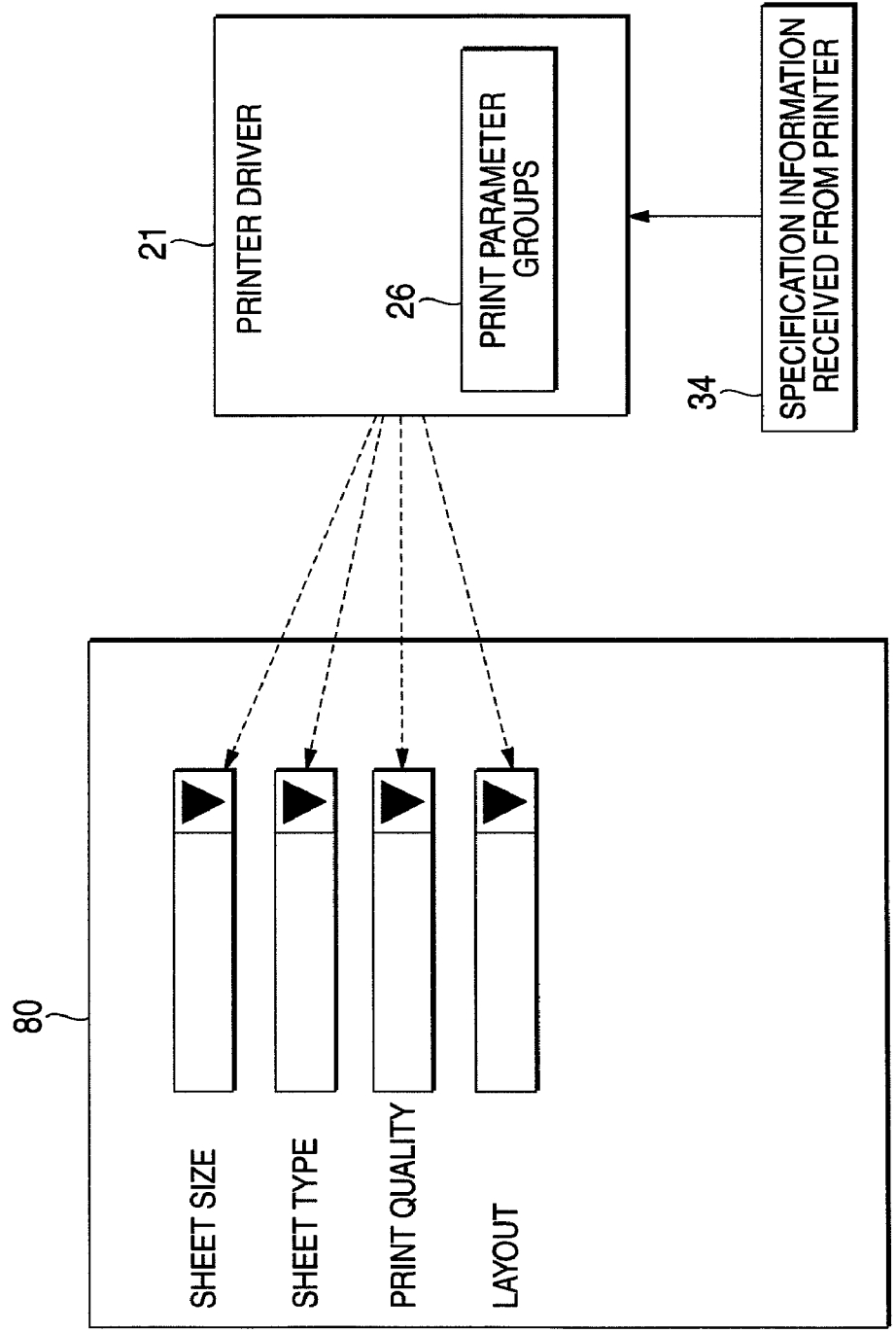

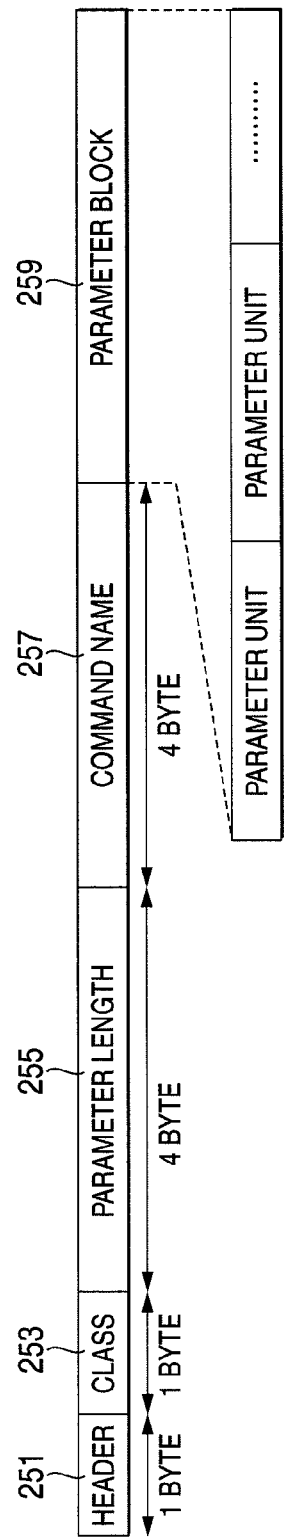

FIG. 13A
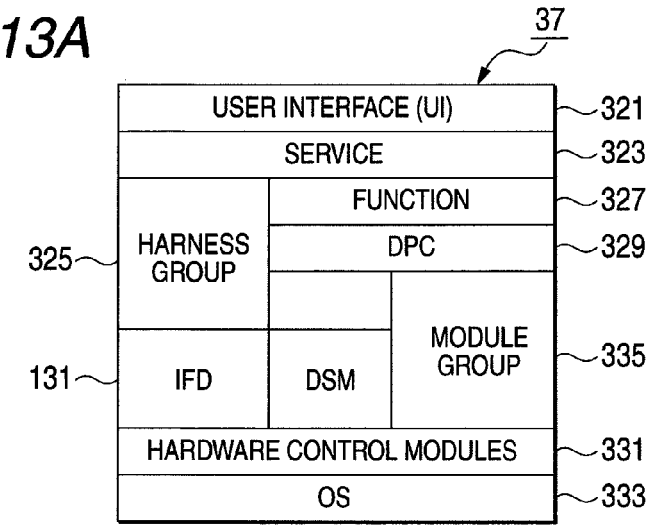
FIG. 13B
| INITIATOR | MEMBER | | TERMINATOR |
|---|---|---|---|
| I-A | M-A | M-D | T-A |
| I-B | M-B | M-E | T-B |
| I-C | M-C | M-H | T-C |
FIG. 13C
| PRINT PROCESSING ID | ID OF HARNESS TO BE CALLED | PRINT PATH DEFINITION |
|---|---|---|
| LEGACY LANGUAGE MODE PRINTING | HARNESS-1 | I-B → T-B |
| PARTICULAR LANGUAGE MODE PRINTING | HARNESS-1 | I-A → M-E → M-H → T-A |
| DIRECT PRINTING | HARNESS-2 | I-C → M-E → M-H → T-C |
| ⋮ | ⋮ | ⋮ |
FIG. 13D
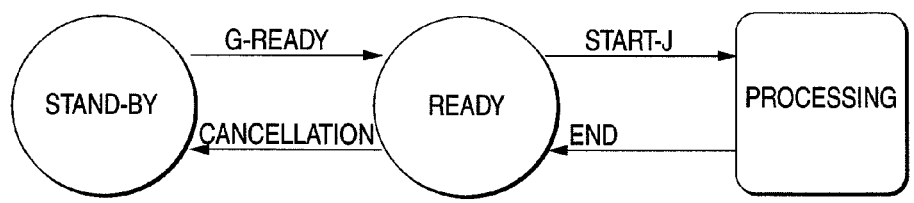

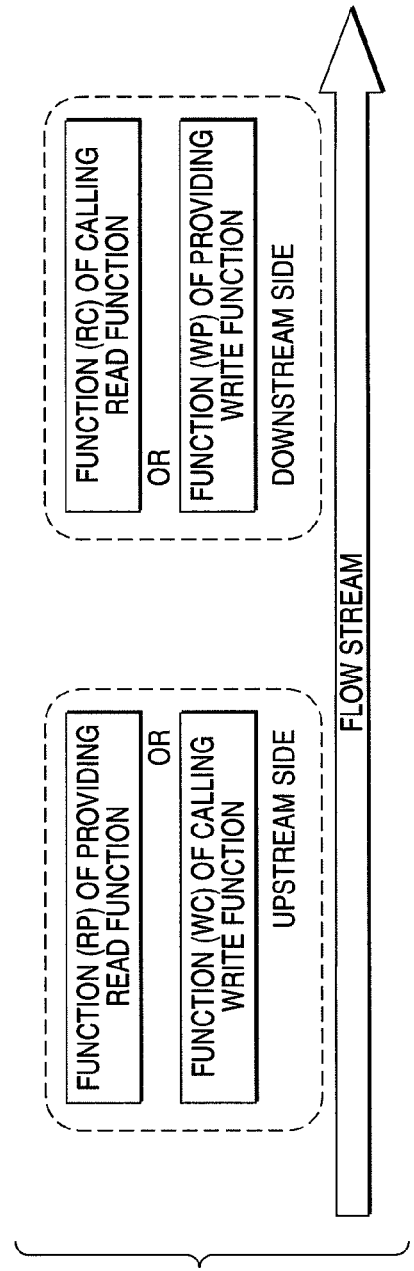
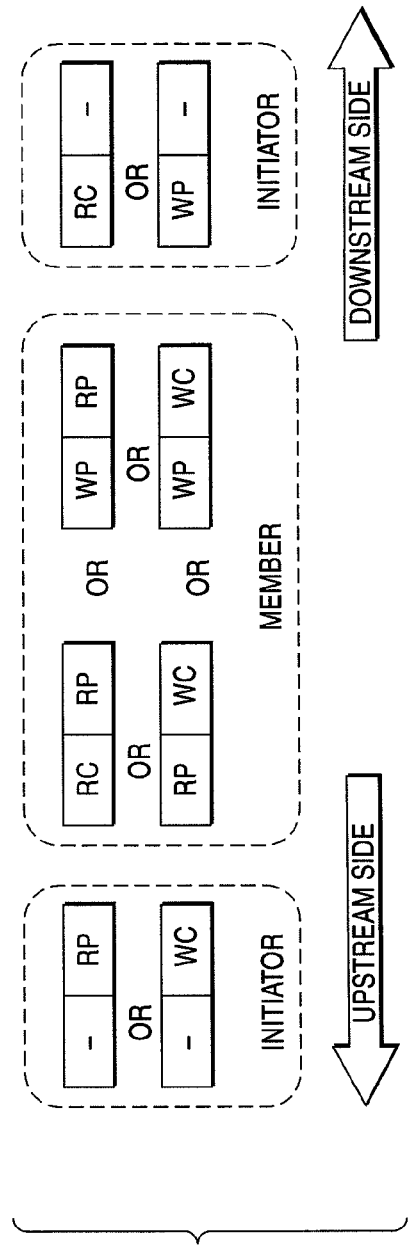
FIG. 14A
FIG. 14B

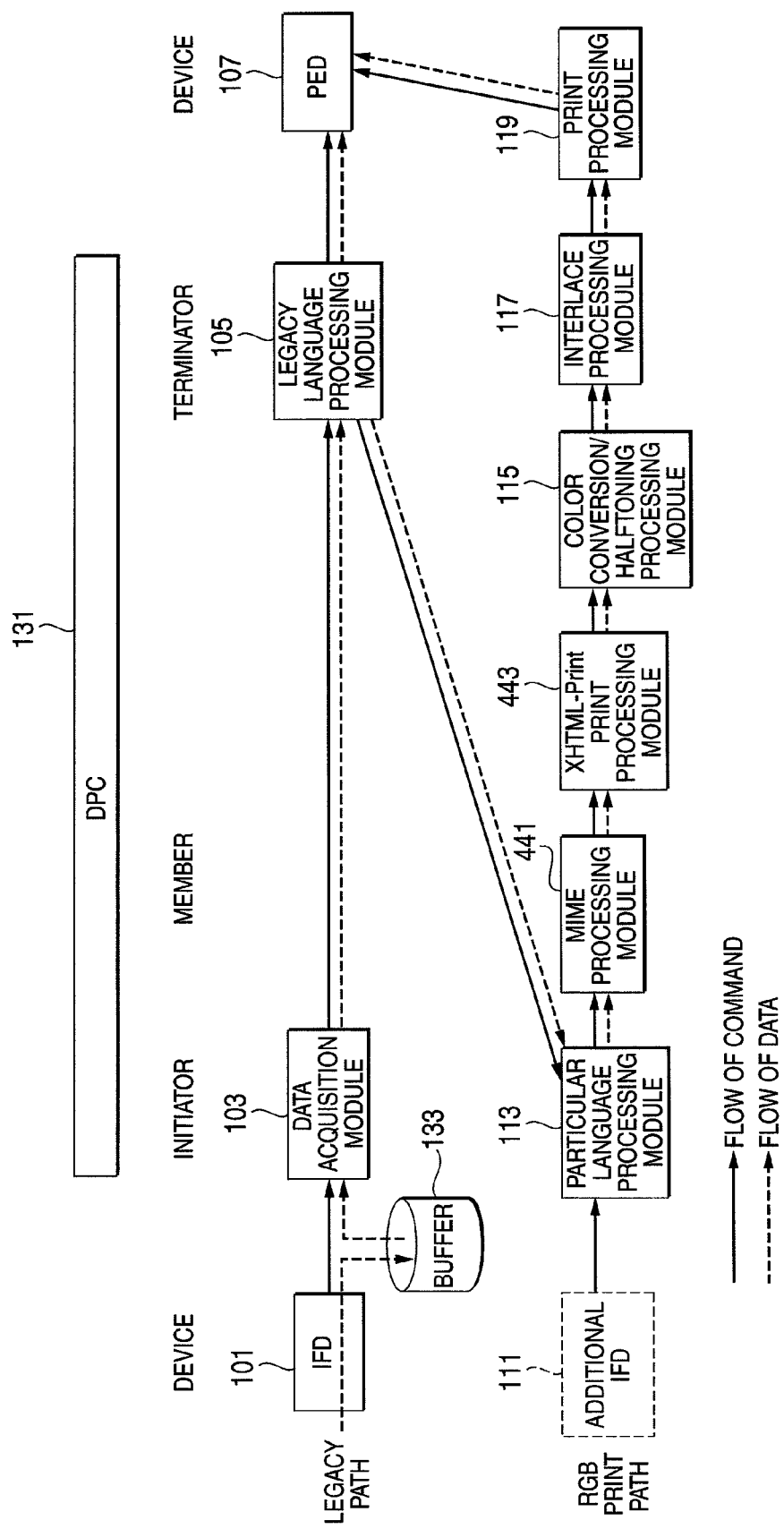

PRINT CONTROL APPARATUS, PRINT CONTROL METHOD AND PRINTER

CROSS-REFERENCE TO RELATED APPLICATIONS

This is a continuation of application Ser. No. 12/698,753 filed Feb. 2, 2010, which is a continuation of Ser. No. 11/303,954 filed Dec. 19, 2005, now patented as U.S. Pat. No. 7,760,373, which claims priority from Japanese Patent Application No. 2004-373811 filed on Dec. 24, 2004. The disclosures of the aforementioned prior applications are hereby incorporated by reference in their entirety.

BACKGROUND OF THE INVENTION

1. Technical Field of the Invention

The present invention relates to a technique for print control.

2. Description of the Related Art

JP-A-2003-175657 (e.g., paragraphs 69-78) discloses one example among techniques for print control.

A digital camera is connected to a printer. The printer communicates its hardware specification to the digital camera. The digital camera extracts a print conditions setting file corresponding to the received hardware specification from plural print conditions setting files, and displays the details of the extracted print conditions setting file on a color liquid crystal display panel. A print control is performed according to print conditions selected by a user through the color liquid crystal display panel.

According to the above technique, it is necessary to prepare print conditions setting files for respective printer hardware specifications in the digital camera in advance. It would be convenient if plural printers that are different from each other in the printer specification such as the hardware specification could be controlled without the need for doing such a preparation.

SUMMARY OF THE INVENTION

One object of the present invention is therefore to control printers having different specifications without the need for doing different preparations for the respective printer specifications.

Further objects of the invention will become apparent from the following description.

A print control apparatus according to a first aspect of the invention comprises a receiving unit for receiving, from a printer, support language information indicating whether a particular kind of language is supported by the printer; a judging unit for judging, by referring to the received support language information, whether the particular kind of language which is supported by the print control apparatus is supported by the printer; a transmitting unit for transmitting, to the printer, a specification information acquisition command for acquiring specification information relating to a specification supported by the printer if it is judged that the particular kind of language is supported by the printer; a receiving unit for receiving the specification information that is transmitted from the printer in response to the specification information acquisition command; and a controller for performing print control processing according to the received specification information.

For example, the controller can generate a print command on the basis of the received specification information and transmit the generated print command to the printer.

The print control apparatus may comprise a transmitting unit for transmitting a command for causing the printer to make a transition to a particular language processing mode for processing the particular kind of language if the printer is in a certain language processing mode for processing a certain kind of language. The print control apparatus may start print control processing that is based on the particular kind of language after causing, using the above unit, the printer to make a transition from the certain language processing mode to the particular language processing mode. For example, the print control apparatus can judge what language processing mode is established in the printer by inquiring of the printer or managing commands that have been transmitted to the printer. If the certain language processing mode and an additional language processing mode are existing language processing modes and the printer is in the additional language processing mode, to cause a transition to the particular language processing mode, the print control apparatus first transmits a command for causing the printer to make a transition from the additional language processing mode to the certain language processing mode and then transmits a command for causing the printer to make a transition from the certain language processing mode to the particular language processing mode. As a result, a transition from the additional language processing mode to the particular language processing mode is effected.

In a print control apparatus according to a first embodiment, the received specification information may include plural print parameters for each of various print conditions. In this case, the controller may display, on display means (e.g., a display monitor), on the basis of the received specification information, a print parameter selection window for allowing a user to select a desired print parameter from the plural print parameters, and perform print control processing using the print parameters selected through the print parameter selection window.

A print control apparatus according to a second embodiment may be such that, in the first embodiment, the received specification information includes plural print parameters of a first kind relating to a first kind of print condition and plural print parameters of a second kind relating to a second kind of print condition. In this case, if a certain print parameter of the first kind is selected through the print parameter selection window, the controller may display one or more print parameters of the second kind corresponding to the certain print parameter of the first kind on the display means in a selectable manner on the basis of the received specification information. In the received specification information, the print parameters of the first kind and those of the second kind may be correlated with each other in such a manner that the controller can recognize which one or more print parameters of the second kind can be selected when each print parameter of the first kind is selected.

A print control apparatus according to a third embodiment may further comprise a detecting unit for detecting, before transmission of the specification information acquisition command, whether the printer performs a bidirectional communication with the print control apparatus; and a memory in which a prescribed parameter group (e.g., a print parameter group including print parameters prepared for each of various print conditions in advance) is stored. In the case of a first result that it is detected that the printer performs a bidirectional communication and it is judged that the particular kind of language is supported by the printer, the transmitting means may transmit the specification information acquisition command to the printer. In the case of a second result that it is detected that the printer does not perform a bidirectional communication and it is judged that the particular kind of language is supported by the printer, the controller may perform print control processing on the basis of print parameters in the print parameter group stored in the memory.

A print control apparatus according to a fourth embodiment may be such that, in the third embodiment, the controller may display, on the display means, a print parameter selection window for allowing a user to select plural print parameters in the received specification information in the case of the first result, and display, on the display means, a print parameter selection window for allowing a user to select plural print parameters in the prescribed print parameters in the case of the second result. The controller may further perform print control processing using the print parameters selected through the print parameter selection window.

In a print control apparatus according to a fifth embodiment, plural classes relating to one print job may have a nest structure. The plural classes may include a second class that is nested within the first class. For a certain job, on the basis of the nest structure, the controller may transmit a command meaning a start of processing relating to the second class to the printer after transmitting a command meaning a start of processing relating to the first class to the printer, and transmit a command meaning an end of processing relating to the first class to the printer after transmitting a command meaning an end of processing relating to the second class to the printer.

For the fifth embodiment, more specific embodiments are possible as described below.

The plural classes include a first class relating to print conditions of a print job, a second class that is nested within the first class and relates to a main body of the print job, a third class that is nested within the second class and relates to pages constituting the print job, and a fourth class that is nested within the third class and relates to data that are described in the pages. In this case, for a certain print job, the controller may perform processing of the following items (1)-(4) according to the nest structure in order of items (1)-(4):

(1) Processing of transmitting print conditions of the print job to the printer.

(2) Processing of transmitting a command meaning a start of a main body of the job to the printer.

(3) Processing of performing, for each of pages of the print job, transmission of a command meaning a start of the page, transmission of data described in the page, and transmission of a command meaning an end of the page (this processing is performed repeatedly according to the number of pages).

(4) Processing of transmitting a command meaning an end of the print job after transmitting a command meaning an end of the last page.

A computer program according to a second aspect of the invention is a computer program for causing a computer to operate as a print control apparatus, the computer program causing the computer to execute the steps of referring to support language information received from a printer and indicating whether a particular kind of language is supported by the printer; judging whether the particular kind of language which is supported by the computer program is supported by the printer; transmitting, to the printer, a specification information acquisition command for acquiring specification information relating to a specification supported by the printer if it is judged that the particular kind of language is supported by the printer; and receiving the specification information that is transmitted from the printer in response to the specification information acquisition command, and performing print control processing according to the received specification information. For example, the above steps may be executed by a processor's (CPU's) reading the computer program. The computer program may cause received information or information to be transmitted to be stored in memory (e.g., a memory) of the computer.

A printing system according to a third aspect of the invention comprises a print control system and a printer which is connected to the print control apparatus. The print control apparatus comprises means for receiving, from the printer, support language information indicating whether a particular kind of language is supported by the printer; means for judging, by referring to the received support language information, whether the particular kind of language which is supported by the print control apparatus is supported by the printer; means for transmitting, to the printer, a specification information acquisition command for acquiring specification information relating to a specification supported by the printer if it is judged that the particular kind of language is supported by the printer; means for receiving the specification information that is transmitted from the printer in response to the specification information acquisition command; and controller for transmitting a print command that conforms to the received specification information to the printer. The printer comprises first memory for storing the support language information; second memory for storing the specification information; means for transmitting the support language information stored in the first memory to the print control apparatus; means for receiving the specification information acquisition command from the print control apparatus when the print control apparatus judges that the particular kind of language which is supported by the print control apparatus is supported by the printer; means for transmitting the specification information stored in the second memory to the print control apparatus in response to the specification information acquisition command; and processing means for performing print processing according to the print command transmitted from the print control apparatus.

In a printing system according to a first embodiment, the print control apparatus may further comprise means for detecting, before transmission of the specification information acquisition command, whether the printer performs a bidirectional communication with the print control apparatus; and memory in which prescribed specification information that is different from the specification information of the printer is stored. In the case of a first result that it is detected that the printer performs a bidirectional communication and it is judged that the particular kind of language is supported by the printer, the transmitting means may transmit the specification information acquisition command to the printer and the controller may transmit print parameters that conform to the received specification information. In the case of a second result that it is detected that the printer does not perform a bidirectional communication and it is judged that the particular kind of language is supported by the printer, the controller may transmit print parameters that conform to the prescribed specification information stored in the memory. The printer may further comprise means for changing, when receiving from the print control apparatus a print parameter that is based on another specification and cannot be handled by the printer, the received print parameter to a print parameter that is based on the specification of the printer. The processing means may perform print processing on the basis of the changed print parameter.

A printing system according to a second embodiment may be such that, in the first embodiment, the changing means of the printer changes, according to predetermined priority order of a print condition of a first kind and a print condition of a second kind, a print parameter of a first kind corresponding to the print condition of the first kind having a higher priority rank with priority given to it, and changes a print parameter of a second kind corresponding to the print condition of the second kind having a lower priority rank so that it becomes conform to the changed print parameter of the first kind.

More specifically, for example, the print control apparatus may transmit a print parameter of the first kind relating to the print condition of the first kind and a print parameter of the second kind relating to the print condition of the second kind to the printer. The printer may be equipped with third memory for storing parameter management information indicating which one or more print parameters of the first kind can be employed among plural print parameters of the first kind when each of plural print parameters of the second kind is employed. If the print parameter of the second kind is not supported by the specification of the printer and it is predetermined in the printer that the print condition of the second kind has a higher priority than the print condition of the first kind, the changing means of the printer may change the print parameter of the second kind received from the print control apparatus to a print parameter of the second kind that conforms to the specification of the printer, determine one or more print parameters of the first kind corresponding to the changed print parameter of the second kind by referring to the parameter management information, and select a print parameter of the first kind to be used for print processing from the determined one or more print parameters of the first kind on the basis of the print parameter of the first kind received from the print control apparatus. The processing means of the printer may perform print processing according to the changed print parameter of the second kind and the selected print parameter of the first kind.

In a printing system according to a third embodiment, the specification information may include plural kinds of print conditions and one or more print parameters corresponding to each of the print conditions. The specification information transmitting means of the printer may transmit, to the print control apparatus, plural print parameters having a nest structure that is based on the plural kinds of print conditions. The printer may further comprise means for giving plural print parameters a nest structure that is based on the plural kinds of print conditions. In this case, the specification information transmitting means may transmit the plural print parameters that have been given the nest structure by the nest structure giving means.

In the third embodiment, for example, where priority order that the print condition of the first kind has a higher priority than the print condition of the second kind is predetermined in the printer, the printer nests one of more print parameters of the second kind that correspond to the print condition of the second kind having a lower priority rank and also correspond to a certain print parameter of the first kind having a higher priority rank within the certain print parameter of the first kind and transmits the certain print parameter of the first kind and the one of more print parameters of the second kind to the print control apparatus.

In a printing system according to a fourth embodiment, plural classes relating to one print job may have a nest structure. The plural classes may include a second class that is nested within the first class. For a certain job, on the basis of the nest structure, the controller may transmit a command meaning a start of processing relating to the second class to the printer after transmitting a command meaning a start of processing relating to the first class to the printer, and transmit a command meaning an end of processing relating to the first class to the printer after transmitting a command meaning an end of processing relating to the second class to the printer.

The printer may read but discard a command meaning the start or end of the processing relating to the first class if the printer receives the command before receiving a command meaning an end of processing relating to the second class after receiving a command meaning a start of processing relating to the second class.

A print control method according to a fourth aspect of the invention comprises the steps of a printer's transmitting, to a print control apparatus, support language information indicating whether a particular kind of language is supported by the printer; the print control apparatus's judging, by referring to the support language information received from the printer, whether the particular kind of language which is supported by the print control apparatus is supported by the printer; the print control apparatus's transmitting, to the printer, a specification information acquisition command for acquiring specification information relating to a specification supported by the printer if it is judged that the particular kind of language is supported by the printer; the printer's transmitting, to the print control apparatus, the specification information in response to the specification information acquisition command received from the print control apparatus; the print control apparatus's transmitting, to the printer, a print command that conforms to the specification information received from the printer; and the printer's performing print processing according to the print command received from the print control apparatus.

A printer according to a fifth aspect of the invention comprises a first memory for storing support language information indicating whether a particular kind of language is supported by the printer; a second memory for storing specification information relating to a specification supported by the printer; a transmitting unit for transmitting the support language information stored in the first memory to a print control apparatus; a receiving unit for receiving the specification information acquisition command from the print control apparatus when the print control apparatus judges that the particular kind of language which is supported by the print control apparatus is supported by the printer; a transmitting unit for transmitting the specification information stored in the second memory to the print control apparatus in response to the specification information acquisition command; a receiving unit for receiving a print command that is transmitted from the print control apparatus in response to the specification information; and a processing unit for performing print processing according to the received print command.

For example, in transmitting prescribed information to the print control apparatus, the printer may incorporate the support language information into the prescribed information. Alternatively, the printer may take the trouble to transmit the support language information separately from the prescribed information.

Each unit in the above-described print control apparatus, printing system, and printer can be implemented by hardware, a computer program, or a combination thereof. And the processing of each unit may be performed by a single component (e.g., hardware, a computer program, or a combination thereof) or plural components.

BRIEF DESCRIPTION OF THE INVENTION

FIG. 2 shows an exemplary structure of a layout management table 61.

FIG. 3 shows an exemplary structure of a printing method management table 63.

Figure 7:
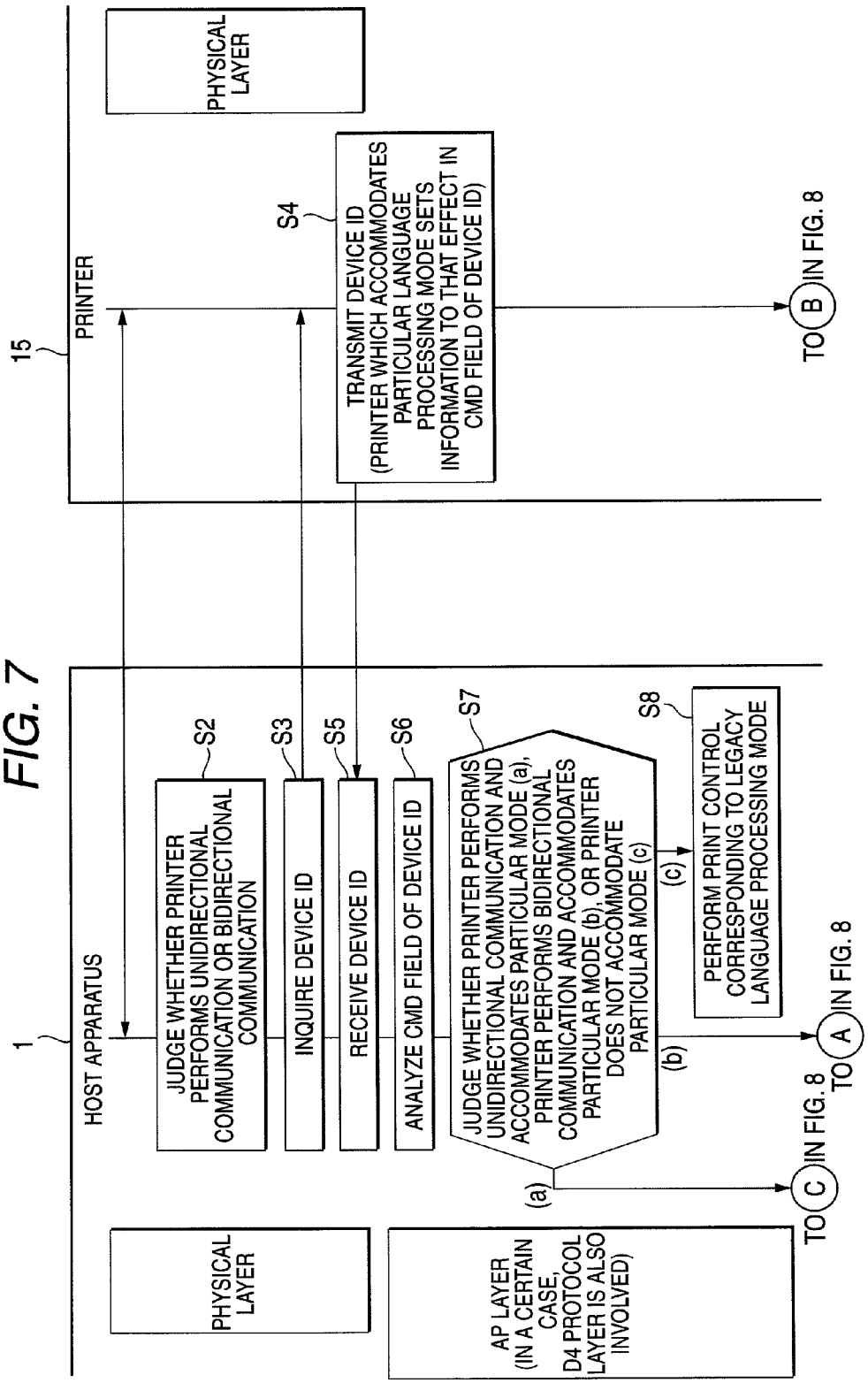

FIG. 7 outlines part of a process executed in the printing system according to the embodiment.

Figure 8:
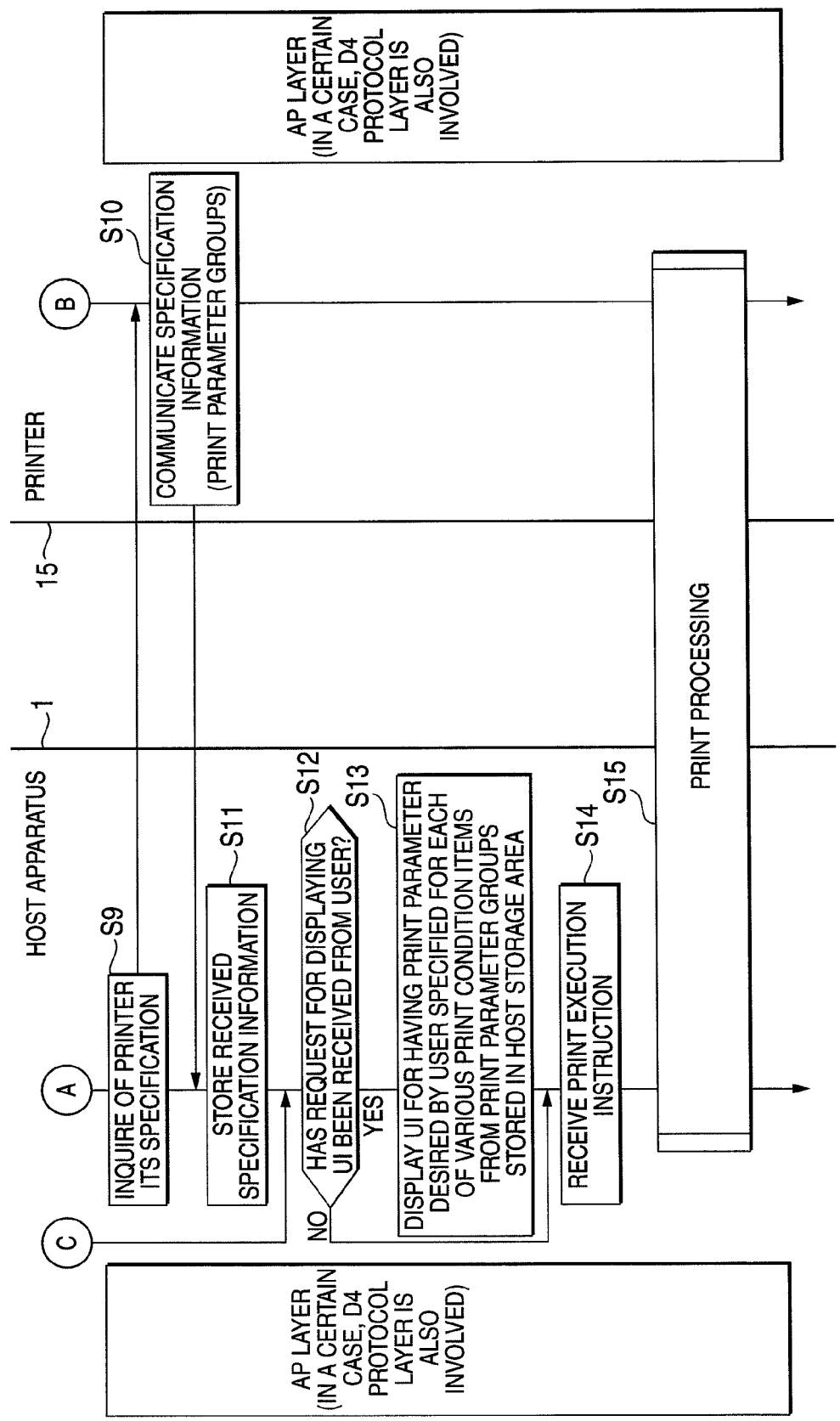

FIG. 8 outlines the other part of the process executed in the printing system according to the embodiment.

Figures 9A, 9B, 9C:
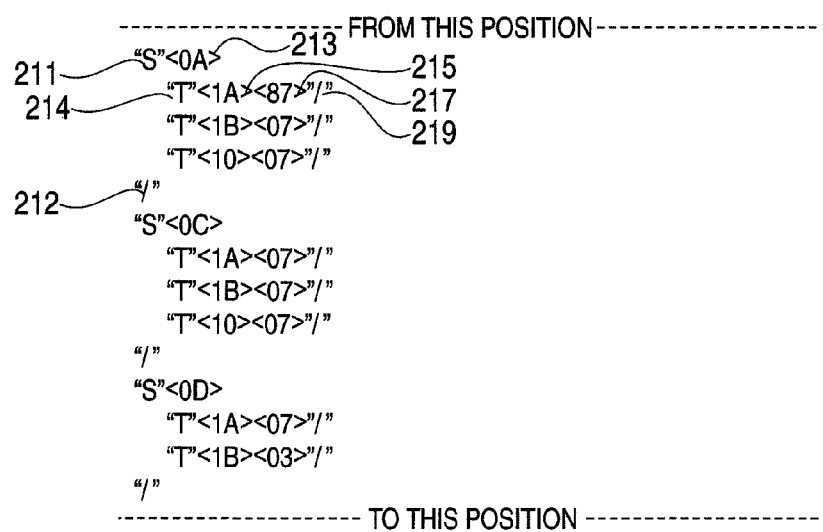

FIG. 9A shows the structure of an exemplary device ID, FIG. 9B conceptually shows the structure of specification information that is transmitted to a host apparatus 1, and FIG. 9C shows a specific example of the specification information that is transmitted to the host apparatus 1.

FIG. 10 shows the structure of an exemplary print parameter selection window 80.

FIG. 11A shows an exemplary format of a command that is described in a particular language, and FIG. 11B shows exemplary classes to be written in a class field.

Figure 12:
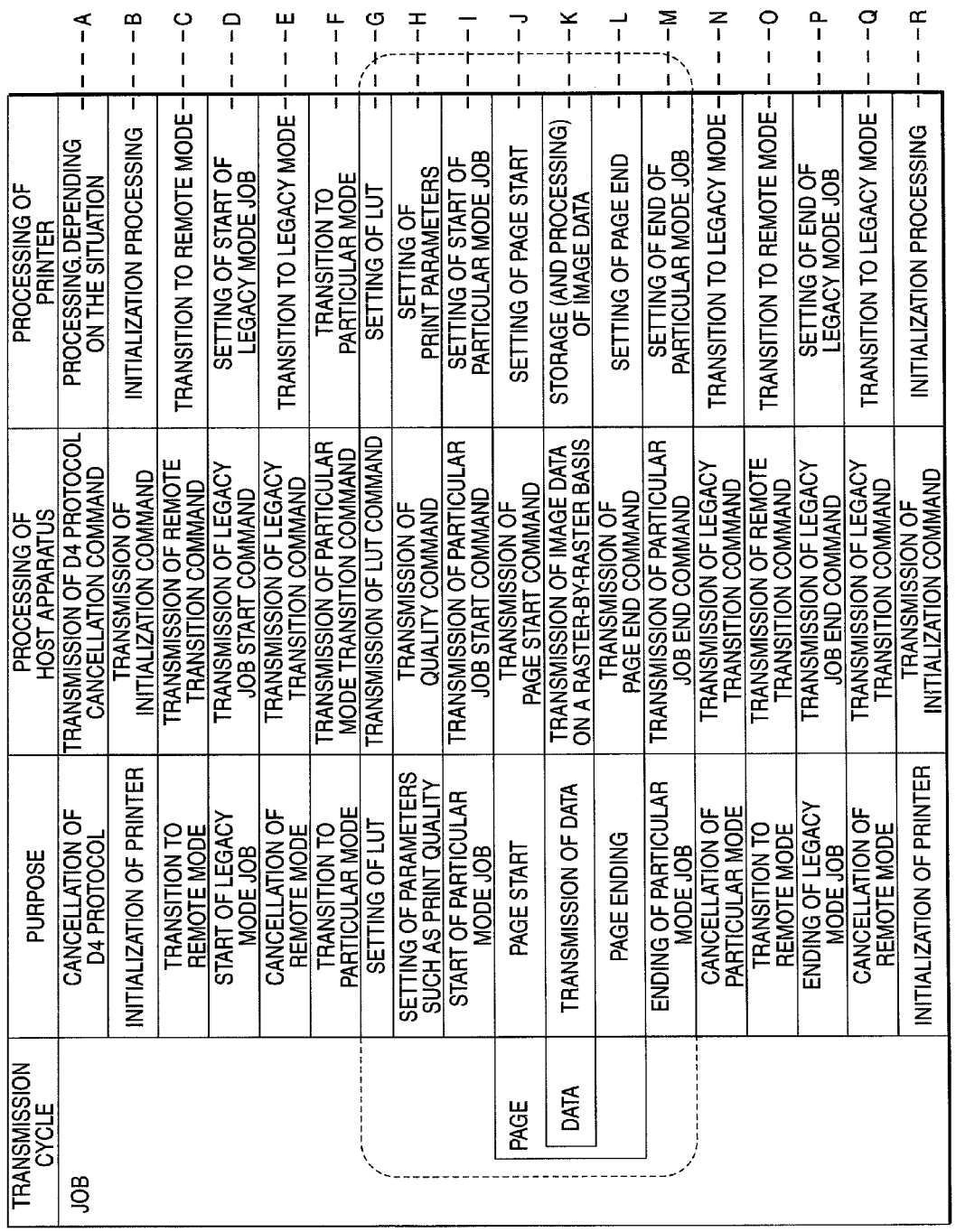

FIG. 12 shows an example of a specific process that corresponds to print processing that is performed at step S15 shown in FIG. 8.

FIG. 13A shows the configuration of an exemplary software group 37, FIG. 13B shows an exemplary module group 335 that is controlled by a DPC 131, FIG. 13C shows the structure of exemplary information relating to module arrangements, and FIG. 13D shows how transitions between the statuses of each module occur.

FIG. 14A shows a function of each module, and FIG. 14B shows functions of an initiator module, a member module, and a terminator module.

Figure 15:
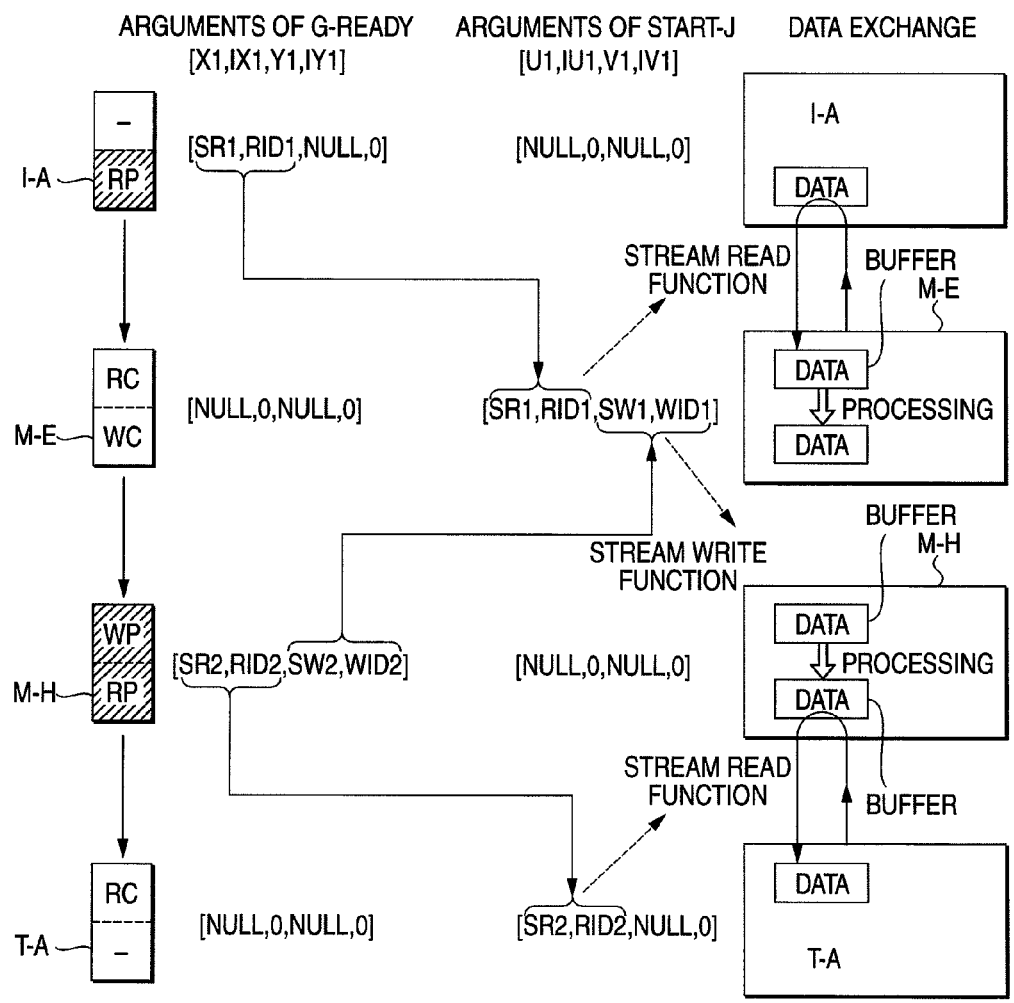

FIG. 15 shows an exemplary data processing flow in a print path.

Figure 16:
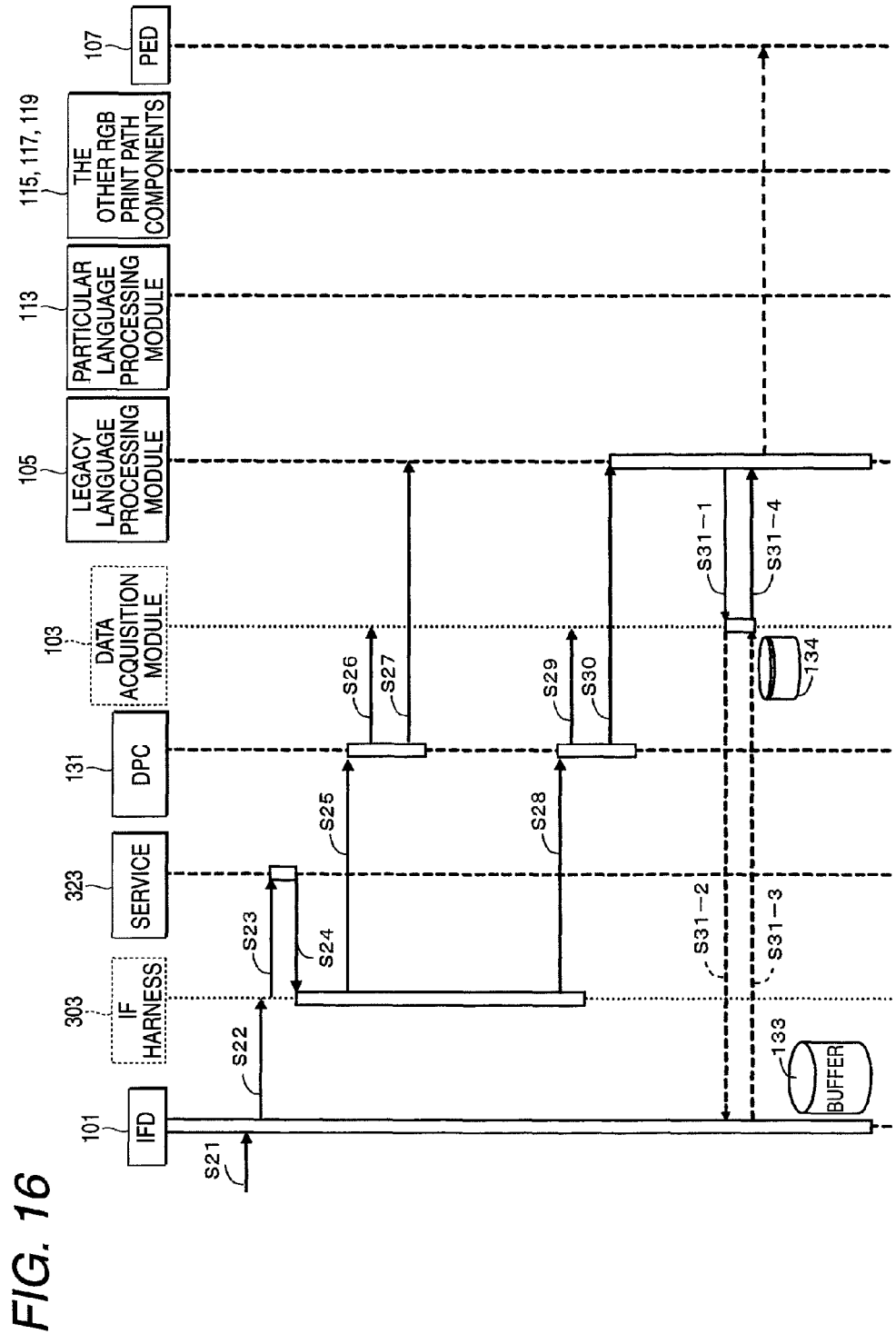

FIG. 16 shows part of a series of steps executed in a printer 15 as it receives a command described in a legacy language and then a command described in the particular language.

Figure 17:
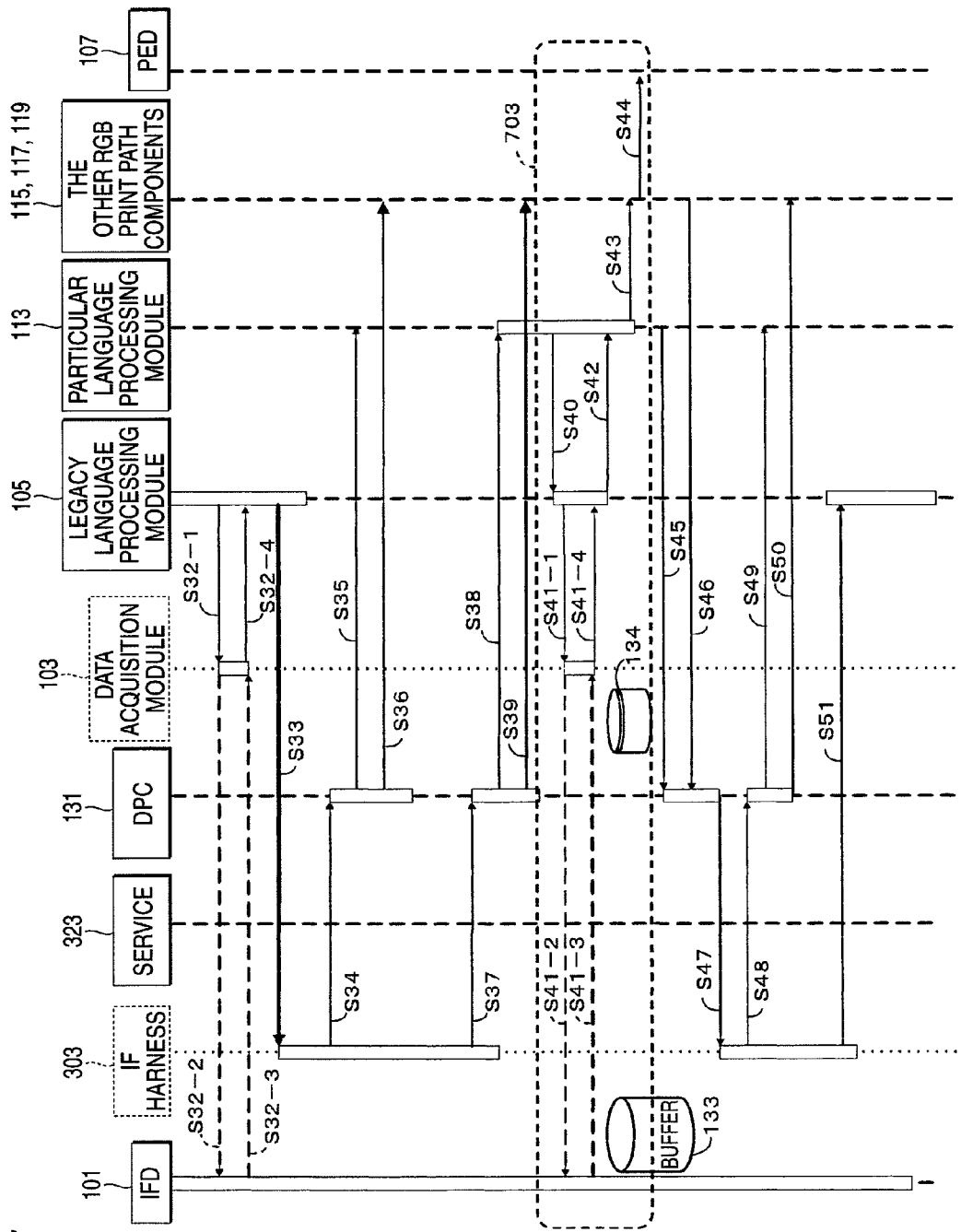

FIG. 17 shows steps that follow the steps of FIG. 16.

Figure 18:
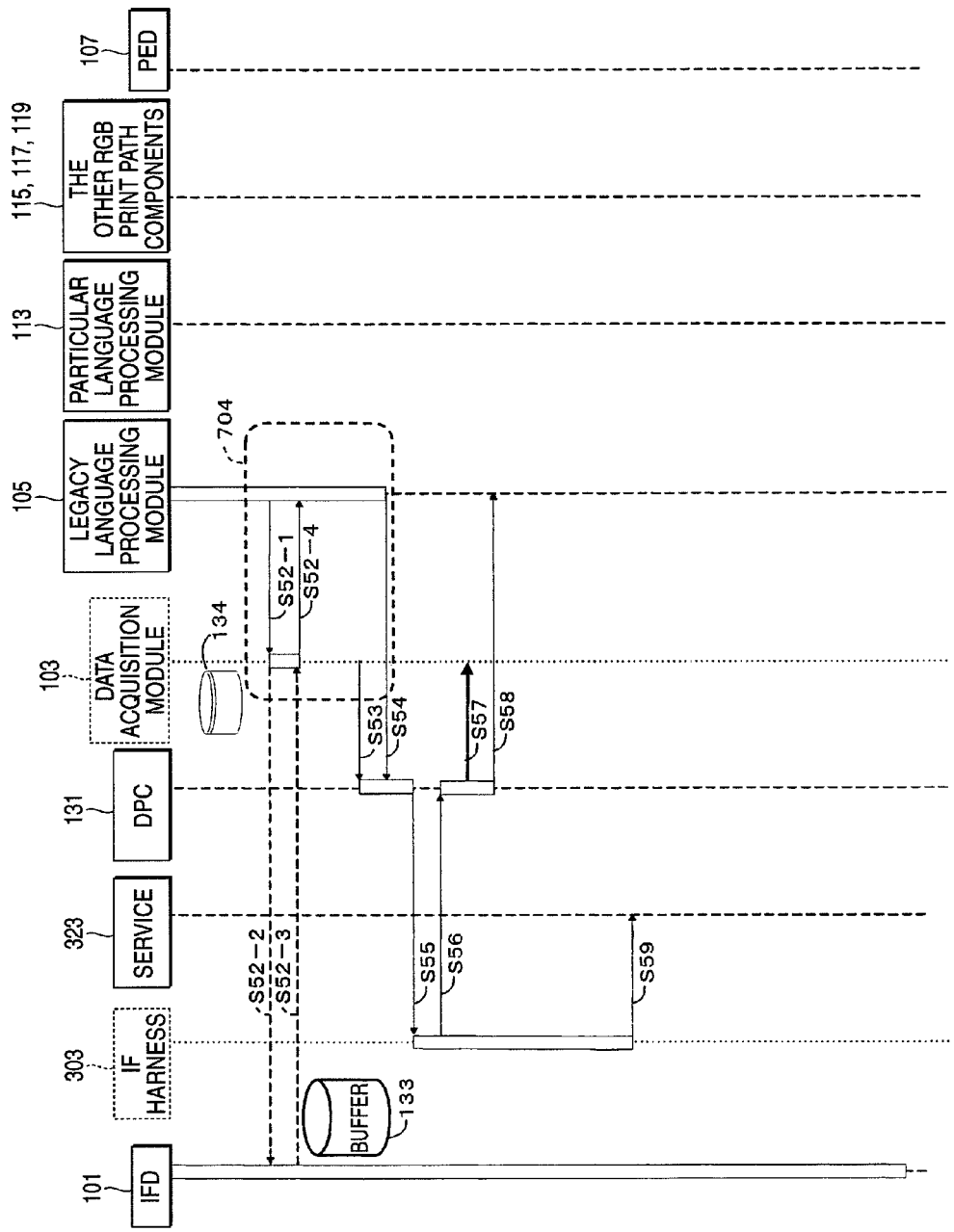

FIG. 18 shows steps that follow the steps of FIG. 17.

Figure 19:
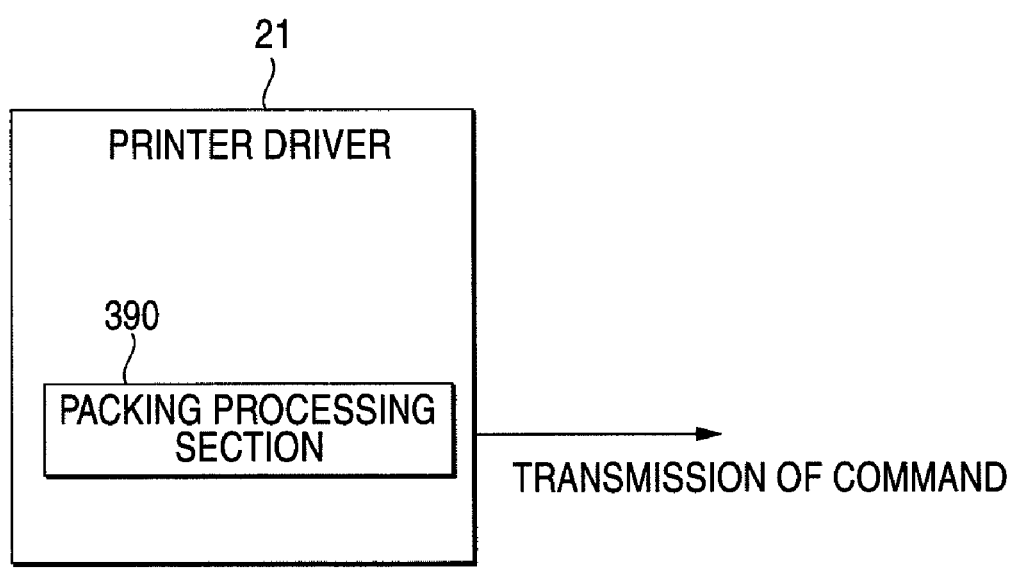

FIG. 19 shows the configuration of an exemplary printer driver according to a first modification to the embodiment of the invention.

FIG. 20 shows the configuration of an exemplary print path in a printer that receives data from the printer driver of FIG. 19.

DETAILED DESCRIPTION OF THE INVENTION

An embodiment of the present invention will be hereinafter described with reference to the drawings. In the following description, for the sake of convenience, a medium on which an image is printed will be called a "sheet." However, such a medium is not limited to a paper medium and may be another kind of medium such as a CD (compact disc) or an OHP film.

Figure 1:
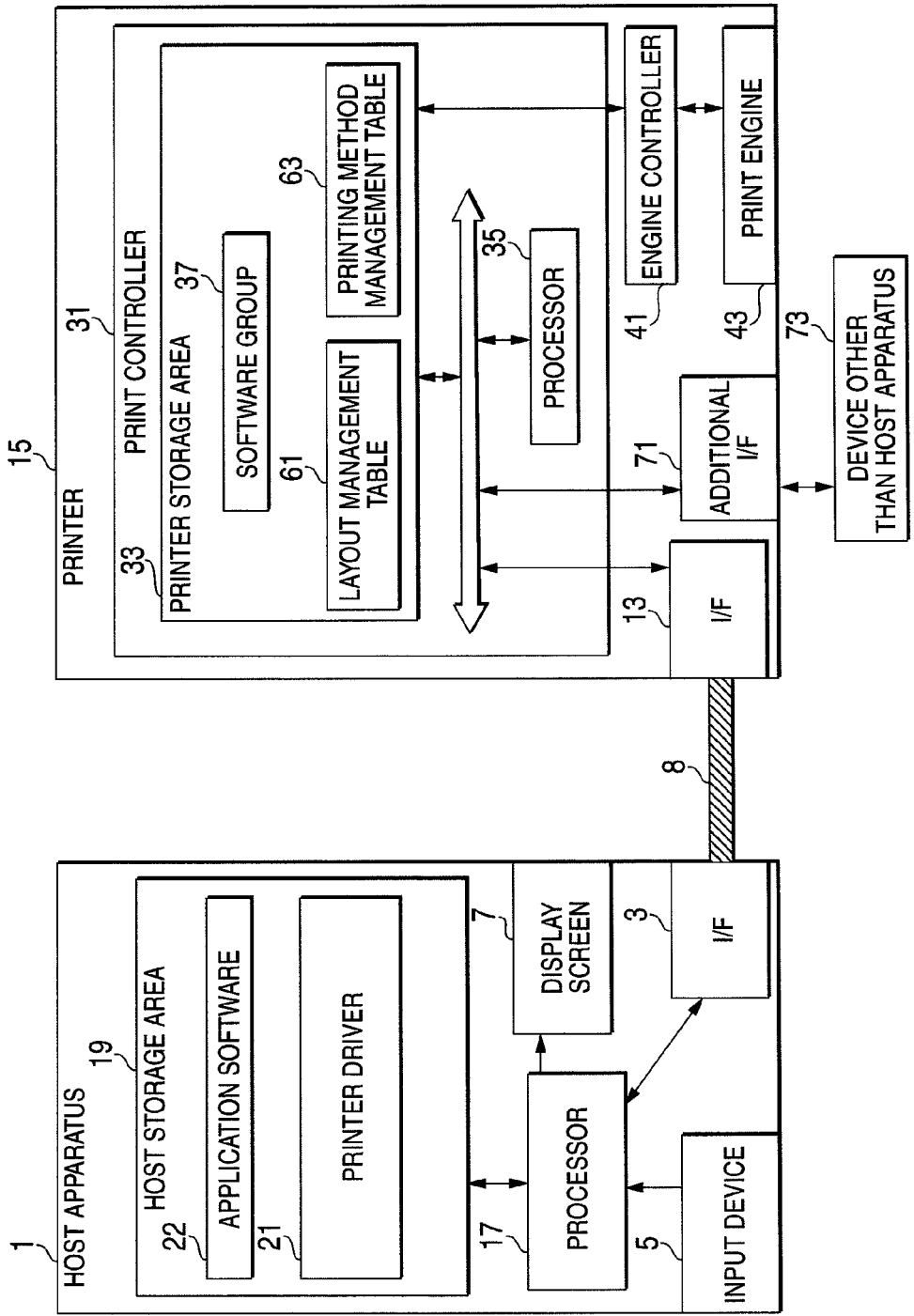
FIG. 1 shows the configuration of a printing system according to an embodiment of the invention.

FIG. 1 shows the configuration of a printing system according to an embodiment of the invention.

An interface circuit (hereinafter abbreviated as "I/F") 3 of a host apparatus 1 (e.g., personal computer) and an I/F 13 of a printer 15 are connected to each other via a cable 8. For example, each of the I/Fs 3 and 13 is an interface circuit that performs a communication according to the USB protocol or an interface circuit that performs a parallel communication.

The host apparatus 1 is equipped with an input device 5 (e.g., plural input keys or a pointing device), a display screen 7, a host storage area 19, and a processor 17 (e.g., CPU). The input device 5 and the display screen 7 may be integral with each other as in the case of a touch panel.

For example, the host storage area 19 is a storage area of at least one of a memory and a hard disk drive. For example, application software 22 for outputting image data and a printer driver 21 for processing, when necessary, image data of the RGB colorimetric system that are output from the application software 22 and transferring resulting image data to the printer 15 are stored in the host storage area 19. The application software 22 and the printer driver 21 operate when read into the processor 17. The processing that is performed by the printer driver 21 that has been read into the processor 17 will be described later in detail.

The printer 15 may be of any kind (e.g., a laser printer or a serial printer such as an ink-jet printer). The printer 15 is equipped with a print engine 43 for printing an object such as an image or text, a print controller 31 for generating print data according to a command sent from the host apparatus 1, and an engine controller 41 for controlling the print engine 43 on the basis of the print data generated by the print controller 31. The printer 15 may also be equipped with an additional I/F 73 (described later) in addition to the I/F 13.

The print controller 31 is provided with a printer storage area 33 and a processor (e.g., CPU) 35.

The printer storage area 33 is a storage area that is provided by one or plural storage devices (e.g., at least one of a volatile memory and a nonvolatile memory). For example, a software group 37, a layout management table 61, and a printing method management table 63.

The software group 37 includes plural computer programs that operate when read into the processor 35. For example, the software group 37 can receive image data of the RGB colorimetric system from the host apparatus 1, perform a color conversion for converting the received image data to image data of another colorimetric system (e.g., CMY colorimetric system), and perform halftoning (e.g., binarization) on the latter image data.

Information of what sheet types are available and what layouts are possible for what sheet sizes is recorded in the layout management table 61. For example, as shown in FIG. 2, sheet type parameters representing respective sheet types, sheet size parameters representing sheet sizes that are supported for each sheet type, and layout parameters representing layouts that are possible for each sheet size are recorded in the layout management table 61. As shown in FIG. 2, in the printer 15, if a sheet size "A4," for example, is specified, the processor 35 can recognize, by referring to the layout management table 61, that sheet types "photographic sheet," "glossy sheet," "Photomat sheet," and "plain sheet" are available and both of what is called "borderless printing" and "bordered printing" can be performed.

For example, each parameter may be either a word in a text format that can be understood by humans or a code that cannot be understood by humans but can be understood by a computer program. In the latter case, the printer driver 21 can cause each parameter to be displayed in the form of a word that can be understood by humans.

Information of what kinds of print processing should be performed for what sheet types and what print quality levels is recorded in the printing method management table 63. For example, as shown in FIG. 3, information of what output resolution value should be set (in other words, what resolution a printed image should be given), which of bidirectional printing and unidirectional printing should be employed, and what dot size version should be employed for each combination of a sheet type parameter and a print quality parameter is recorded in the printing method management table 63. As shown in FIG. 3, if a sheet type parameter "photographic sheet" and a print quality parameter "high," for example, are specified, the processor 35 can recognize, by referring to the printing method management table 63, that an image should be printed by unidirectional printing at an output resolution "2,880 dpi (horizontal)×720 dpi (vertical)" with a dot size version "VSD3."

As seen from FIG. 3, in this embodiment, print quality parameters "high," "normal," and "draft" are employed (it is not necessary to limit the print quality parameter to these three kinds). "High" means highest image quality. "Normal" means that the image quality is lower but the print speed is higher than in the case of "high." "Draft" means that the image quality is lower but the print speed is higher than in the case of "normal."

In this embodiment, the term "bidirectional printing" means that a print head which reciprocates in the main scanning direction forms dots in each of a go scan and a return scan. In contrast, the term "unidirectional printing" means that the print head forms dots in one of a go scan and a return scan and do not in the other scan. That is, the table 63 of FIG. 3 is an example of a case that the printer 15 is a serial printer. In the table 63 of FIG. 3, "bidirectional printing on" means that bidirectional printing should be performed and "bidirectional printing off" means that bidirectional printing should not be performed. In the table 63 of FIG. 3, an entry "on/off" means that either of bidirectional printing and unidirectional printing may be performed. The unidirectional printing can provide a high quality print result more easily than the directional printing.

In this embodiment, the term "dot size version" means the amount of an ink droplet that is discharged from the print head. In this embodiment, as the numerical value following "VSD" increases, the amount of an ink droplet decreases and hence a high-resolution print result can be obtained more easily.

Figure 4:
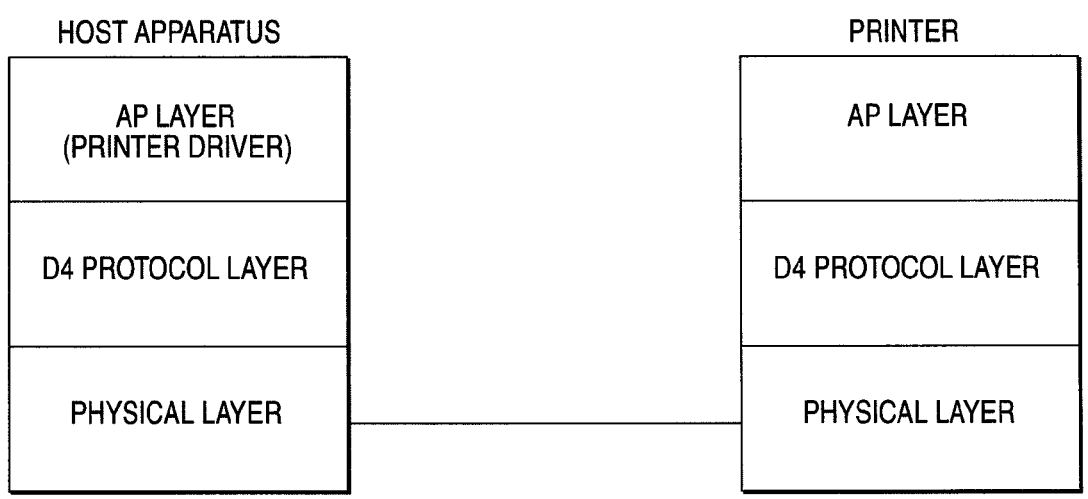
FIG. 4 shows an exemplary protocol layered structure according to which a communication is performed in the printing system according to the embodiment.

FIG. 4 shows an exemplary protocol layered structure according to which a communication is performed in the printing system according to this embodiment.

In this embodiment, a physical layer exists as the lowest layer and an IEEE1284.4 protocol layer (for the sake of convenience, IEEE1284.4 will be referred to as "D4") exists above the physical layer. An application layer (hereinafter abbreviated as "AP layer") is located above the D4 protocol layer. In the host apparatus 1, both of the printer driver 21 and the application software 22 serve for a communication in the AP layer.

It is not always the case that both of the host apparatus 1 and the printer 15 have a D4 protocol layer. There may be a case that only one of the host apparatus 1 and the printer 15 has a D4 protocol layer or neither of those has a D4 protocol layer.

The embodiment will be hereinafter described in more detail.

Figure 5:
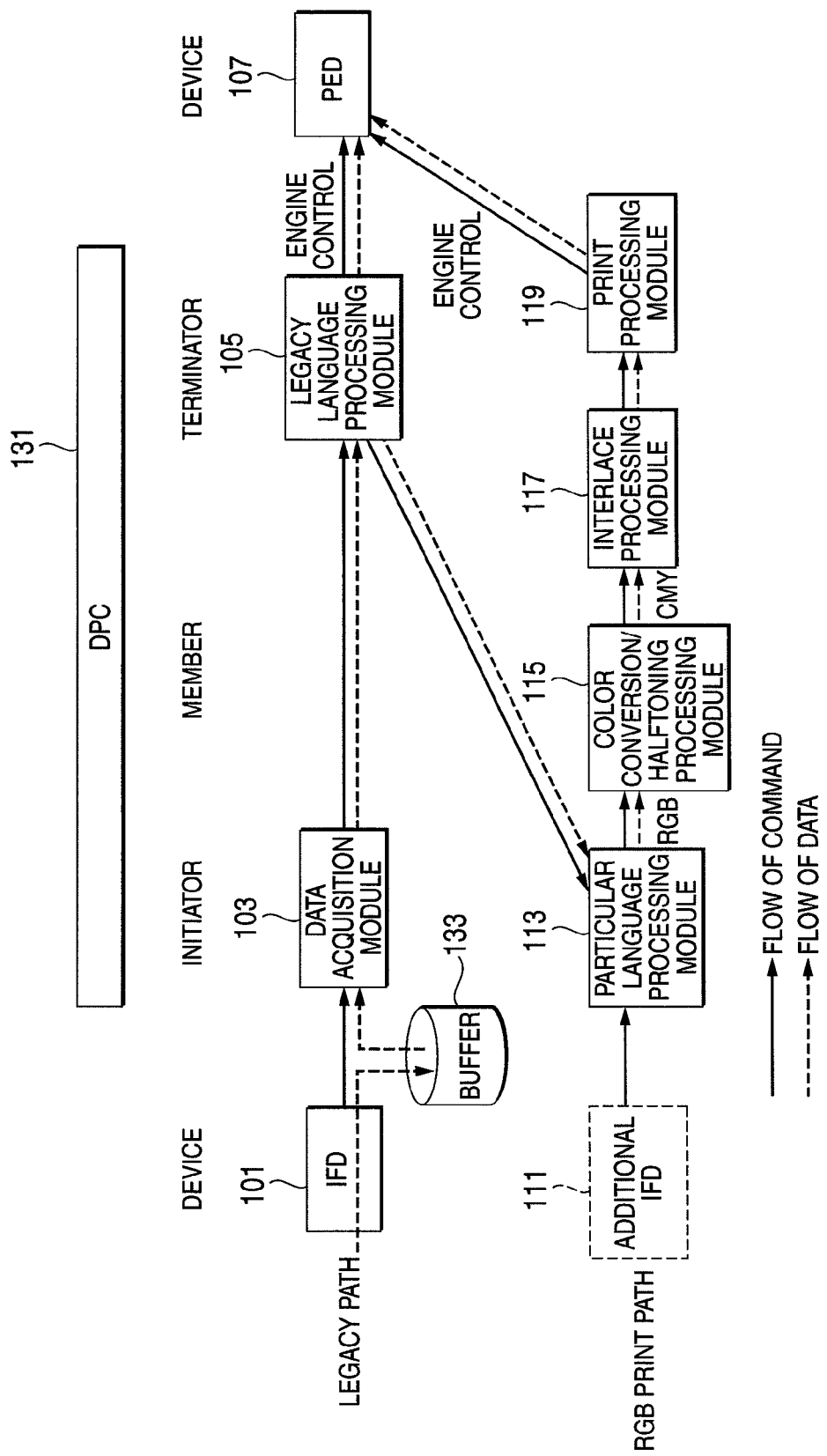
FIG. 5 shows plural computer programs included in a software group and print paths each of which is formed by plural computer programs.

FIG. 5 shows plural computer programs included in the software group 37 and print paths each of which is formed by plural computer programs.

For example, the software group 37 includes a hardware interface driver (hereinafter abbreviated as "IFD") 101, a data acquisition module 103, a legacy language processing module 105, a print engine driver (hereinafter abbreviated as "PED") 107, a particular language processing module 113, a color conversion/halftoning module 115, an interlace processing module 117, a print processing module 119, and a data processing path controller (hereinafter abbreviated as "DPC") 131.

The IFD 101 exists as a computer program for controlling operation of prescribed hardware (e.g., I/F 13), and the PED 107 exists as a computer program for controlling operation of the engine controller 41. The modules 103, 105, 113, 115, 117, and 119 can be started or finished dynamically in response to an instruction from the DPC 131 which manages data processing paths.

For example, when the data acquisition module 103 and the legacy language processing module 105 are started in response to an instruction from the DPC 131, a legacy path having the modules 103 and 105 as components is constructed in the printer 15. For example, the legacy path is a data processing path (hereinafter also called "print path" because it exists in the printer) along which a command written in an existing kind of language (hereinafter referred to as "legacy language") flows. More specifically, for example, the legacy path is a print path along which print image data that have been subjected to an RGB-to-CMY color conversion and halftoning flow. For example, print image data reflect details of inks (e.g., ink colors, the number of colors, or ink types) and details of ink droplets (e.g., three sizes (large, medium, and small)) of the printer 15 and the number of nozzles and a nozzle pitch of the print head (not shown).

The printer 15 is configured so as to be able to receive not only print image data but also image data of the RGB colorimetric system (hereinafter referred to as "RGB image data"), generates print image data on the basis of the received RGB image data, and performs printing using the generated print image data. More specifically, for example, the printer 15 can receive RGB image data from a device 73 (e.g., a memory card or a digital camera) other than the host apparatus 1 via the additional I/F 71 under the control of an additional IFD 111 and generate and print print image data of the received RGB image data. In the following description, whereas a print path along which print image data (i.e., data that have been subjected to an RGB-to-CMY color conversion flow will be called "legacy path," a print path along which RGB image data flow will be called "RGB print path." When the particular language processing module 113, the color conversion/halftoning module 115, the interlace processing module 117, and the print processing module 119 are started by the DPC 131, an RGB print path having the modules 113, 115, 117, and 119 as components is constructed.

In this embodiment, if, for example, a prescribed negotiation for determining a type of data to be input has been made between the printer 15 and a device to communicate with, an RGB print path is constructed (e.g., without construction of a legacy path) and RGB data are input to the RGB print path via the additional IFD 111 without intervention of a legacy path. In other words, if the fact that RGB data will be input has been determined by the above prescribed negotiation, the additional IFD 111 is employed as an inlet of the RGB image data and an RGB print path is constructed.

On the other hand, in this embodiment, if, for example, no prescribed negotiation for determining a type of data to be input has been made between the printer 15 and a device to communicate with, a legacy path is constructed and data are input to the legacy path. In other words, if, for example, no such negotiation has been made, the IFD 101 is employed as an inlet of the input data and a legacy path is constructed. If the data turn out to be RGB image data after being input to the legacy path, in the printer 15 an RGB print path is constructed with the legacy path kept effective and the RGB image data are input to the RGB print path via the legacy path.

As described above, a legacy path along which print image data received from the host apparatus 1 flow and an RGB print path along which RGB image data received from the device 73 other than the host apparatus 1 flow can be constructed in the printer 15. The printer 15 can switch, from a legacy path to an RGB path, the print path along which data and a command coming from the host apparatus 1 is to flow.

More specifically, for example, data and a command coming from the host apparatus 1 is received by the I/F 13. For example, the IFD 101 stores the data and command coming from the host apparatus 1 in a data buffer 133 which is provided in the printer storage area 33 (or a memory (not shown) of the I/F 13). The data and command stored in the data buffer 133 are read by the data acquisition module 103 (e.g., on a prescribed size basis) and passed to the legacy language processing module 105. The legacy language processing module 105 judges a description language of the received command. If judging that the command is written in the legacy language, the legacy language processing module 105 interprets the command and outputs a command for controlling the PED 107 to the PED 107 on the basis of an interpretation result. That is, the legacy language processing module 105 performs processing in a legacy language processing mode if the description language of the received command is the legacy language. The PED 107 controls the print engine 43 by controlling the engine controller 41 on the basis of the command sent from the legacy language processing module 105.

On the other hand, if judging that the description language of the received command is a particular language, the legacy language processing module 105 passes the command to the particular language processing module 113. From this time onward, the legacy language processing module 105 transfers an acquired command and data to the particular language processing module 113 without interpreting those until receiving an instruction to finish the processing in a particular language processing mode (or an instruction to move to another language processing mode).

The particular language processing module 113 performs processing in the particular language processing mode. The particular language processing mode is a mode for processing a newly provided kind of language (hereinafter referred to as "particular language") in addition to existing kinds of languages. For example, the particular language is a language that is used for indicating that a command that is input from the host apparatus 1 is a command for printing of image data of the RGB colorimetric system. For example, the particular language processing module 113 interprets a command passed from the legacy language processing module 105 and performs processing on the basis of an interpretation result, or passes received RGB image data to the color conversion/halftoning module 115. The color conversion/halftoning module 115 converts the received RGB image data to CMY image data, performs halftoning on the CMY image data, and outputs the CMY data that have been subjected to the halftoning to the interlace processing module 117. The interlace processing module 117 performs processing that is necessary for interlaced printing on the received CMY image data if necessary (e.g., according to an instruction from the printer driver 21) and outputs resulting CMY image data to an image buffer (not shown). The image buffer is provided in the printer storage area 33, for example, and configured so as to be suitable for the nozzle structure etc. of the print head. The print processing module 119 generates a command for controlling the PED 107 on the basis of the CMY image data that have been output to the image buffer, and outputs the generated command to the PED 107. The PED 107 controls the print engine 43 by controlling the engine controller 41 on the basis of the command sent from the print processing module 119.

The print processing performed by the printer 15 has been outline above. In this embodiment, for example, the particular language processing module 113 may acquire data and a command from the data buffer 133 rather than via the legacy language processing module 105. Further, the legacy language may be ESC/P (Epson standard code for printer), for example. On the other hand, the particular language can be called "ESC/P-R," for example, because it is used for transmission of RGB image data.

Figure 6:
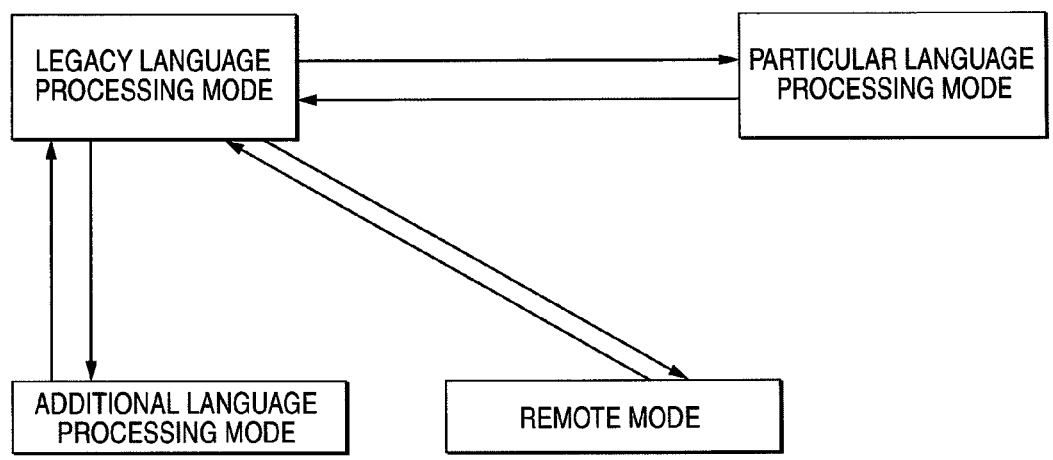
FIG. 6 show plural language processing modes in a printer 15 and how transitions occur between these language processing modes.

FIG. 6 show plural language processing modes in the printer 15 and how transitions occur between these language processing modes.

The printer 15 has, in addition to the above-described legacy language processing mode and particular language processing mode, a remote mode and an additional language processing mode (e.g., a mode for processing PostScript) (the importance of the remote mode will be described later). In the printer 15, mode transitions occur according to an instruction from the host apparatus 1 with the legacy language processing mode as a pivotal point. For example, the printer 15 can make a transition from the particular language processing mode to the remote mode via the legacy language processing mode but cannot make a direct transition from the particular language processing mode to the remote mode. The same is true of a transition in the opposite direction; the printer 15 makes a transition from the remote mode to the particular language processing mode via the legacy language processing mode. Since the particular language processing mode is a language processing mode that is newly provided in the printer 15, to make the printer 15 highly stable (i.e., low in the frequency of occurrence of errors) it is preferable that the direct destination of transitions involving the particular language processing mode be the existing legacy language processing mode.

A transition between language processing modes may be controlled by the legacy language processing module 105, for example. For example, if receiving a command to make a transition to the particular language processing mode in a state that the legacy language processing mode is established, the legacy language processing module 105 recognizes subsequently received commands as commands described in the particular language. If receiving a command to make a transition to the particular language processing mode (and/or a command to make a transition to the remote mode or the additional language processing mode) in a state that the particular language processing mode is established, the legacy language processing module 105 disregards (e.g., reads but discards) that command.

For example, if receiving a command to make a transition to the legacy language processing mode in a state that the particular language processing mode is established, the legacy language processing module 105 recognizes subsequently received commands as commands described in the legacy language. If receiving a command to make a transition to the legacy language processing mode in a state that the legacy language processing mode is established, the legacy language processing module 105 disregards (e.g., reads but discards) that command.

For example, if at least one item was set in the legacy language processing mode or the remote mode before a transition to the particular language processing mode, the legacy language processing module 105 returns the settings to initial values and employs settings received in the particular language processing mode (i.e., settings written in the particular language processing mode) for at least one of the following items (1)-(4):

(1) Setting relating to the sheet path (e.g., from what sheet feed tray sheets should be taken and to what sheet ejection bin sheets should be ejected)

(2) Settings relating to the sheet size and the print region (e.g., bordered or borderless)

(3) Settings relating to the print mode (e.g., print quality and a sheet type)

(4) Settings relating to the mechanics control (e.g., a sheet feed sequence)

Next, a process executed in the printing system according to the embodiment will be outlined and then the details of individual steps of the process will be described. In the following description, the legacy language processing mode will be abbreviated as "legacy mode" and the particular language processing mode will be abbreviated as "particular mode."

FIGS. 7 and 8 outline a process executed in the printing system according to the embodiment.

The I/F 3 of the host apparatus 1 is connected to the I/F 13 of the printer 15 (step S1). At this time, the host apparatus 1 judges whether the printer 15 performs a unidirectional communication or a bidirectional communication (S2). For example, where the host apparatus 1 and the printer 15 communicate with each other according to the USB, the host apparatus 1 can judge whether the printer 15 performs a unidirectional communication or a bidirectional communication by receiving a device descriptor from the printer 15 and analyzing it. For example, where the host apparatus 1 is configured so as to transmit parallel data to the printer 15, the host apparatus 1 can judge whether the printer 15 performs a unidirectional communication or a bidirectional communication in accordance with whether or not the level of a prescribed signal line (e.g., "reverse" signal line) has changed.

The host apparatus 1 inquires of the printer 15 a device ID (i.e., an ID for device identification) (S3). In response, the printer 15 transmits a device ID to the host apparatus 1 (S4). Where the printer 15 can perform processing in the particular mode by itself, the printer 15 sets information to that effect (hereinafter referred to as "particular language support information") in a CMD field of a device ID and transmits, to the host apparatus 1, the device ID in which the particular language support information is set. As exemplified in FIG. 9A, the device ID has a data length field, an MFG field, and the CMD field, for example. The printer 15 can set a data length (e.g., in bytes) of the device ID in the data length field, set a maker ID (e.g., maker name) of the printer 15 in the MFG field, and set the particular language support information in the CMD field. Where the printer 15 is of such a printer as cannot perform processing in the particular mode, the printer 15 sets other information in the CMD field (no information may be set in the CMD filed to make it an empty field). Where the particular mode has plural kinds of levels, the printer 15 may set a particular mode level supported by itself in the CMD field. For example, if "1" is set as a particular mode level, the printer driver 21 can judge that the printer 15 has minimum necessary functions for processing in the particular mode. If level "2" or higher is set, the printer driver 21 can judge what functions that are more than the minimum necessary functions are provided in the printer 15. In the case of level "2" or higher, for example, at least one of addition of a class, addition of a command, addition of a parameter unit, and addition of a parameter (described later) can be done. A new command may be added when a parameter unit is added. Addition of a parameter may be permitted for the same command. When receiving a parameter that does not conform to a command support level, the printer 15 may disregard that parameter.

As shown in FIG. 7, the host apparatus 1 receives the printer ID from the printer 15 (S5). Steps S1-S5 are executed in the physical layers. The subsequent steps S6-S15 can be executed in the AP layers and, in a certain case, can be executed in the AP layers with support from the D4 protocol layers. The term "in a certain case" is used above because at least one of the host apparatus 1 and the printer 15 may not have a D4 protocol layer or the D4 protocol layer may not be used even if it is provided.

The printer driver 21 of the host apparatus 1 analyzes the CMD field of the received printer ID (S6), whereby the printer driver 21 can judge whether the printer 15 supports the particular mode. (For example, if detecting particular language support information, the printer driver 21 can judge that the printer 15 supports the particular mode.) Whether the printer 15 performs a unidirectional communication or a bidirectional communication was judged at step S2. The printer driver 21 can acquire the judgment result of step S2 by, for example, referring to a storage area where the judgment result is recorded. Therefore, the printer driver 21 can judge into which of the following items (a)-(c) the printer 15 is classified (S7):

(a) Performs a unidirectional communication and accommodates the particular mode.

(b) Performs a bidirectional communication and accommodates the particular mode.

(c) Does not support the particular mode (whether it performs a unidirectional communication or a bidirectional communication is irrelevant).

If it is judged at step S7 that the printer 15 is classified into item (c), the printer driver 21 performs a print control corresponding to the legacy mode (S8). For example, the printer driver 21 converts RGB image data that are output from the application software 22 to CMY image data (print image data), describes a command for printing the print image data in the legacy language, and transmits the command described in the legacy language to the printer 15.

If it is judged at step S7 that the printer 15 is classified into item (a), as shown in FIG. 8 the printer driver 21 executes step S12 and the following steps (described later) without inquiring of the printer 15 its specification. This is because even if the printer driver 21 inquires of the printer 15 its specification, the printer driver 21 will not receive specification information relating to its specification from the printer 15 because the printer 15 does not perform a bidirectional communication.

If it is judged at step S7 that the printer 15 is classified into item (b), as shown in FIG. 8 the printer driver 21 inquires of the printer 15 its specification (S9). For example, the printer driver 21 transmits a command (hereinafter referred to as "specification information acquisition command") for acquiring specification information relating to its specification to the printer 15. For example, the printer driver 21 transmits a specification information acquisition command that conform to the D4 protocol. That is, at step S9, the host apparatus 1 and the printer 15 communicate with each other in the D4 protocol layers.

In response to the inquiry about the specification, the printer 15 transmits specification information having a prescribed structure to the host apparatus 1 (S10). More specifically, for example, in response to the specification information acquisition command, the printer 15 refers to the layout management table 61 and the printing method management table 63 stored in the printer storage area 33 and thereby recognizes what sheet types are supported and what print layouts are possible for what sheet sizes and what print quality levels are supported for what sheet types. And the printer 15 generates specification information having a prescribed structure on the basis of recognition results and transmits the specification information to the host apparatus 1. For example, the specification information that is transmitted to the host apparatus 1 is given a nest structure by the printer 15 as shown in FIGS. 9B and 9C. FIG. 9B conceptually shows the structure of the specification information that is transmitted to a host apparatus 1, and FIG. 9C shows a specific example of the specification information that is transmitted to the host apparatus 1. In FIG. 9C, data sandwiched between quotation marks "and" is prescribed text data (e.g., ASCII text data) and data sandwiched between marks "<" and ">" is binary data.

For example, information representing a sheet size is located at the head. The head tag (denoted by reference numeral 211 in FIG. 9C) of the sheet size is a prescribed code (e.g., "S") and its end tag (denoted by reference numeral 212 in FIG. 9C) is another prescribed code (e.g., "/"). Parameter-1 (denoted by reference numeral 213 in FIG. 9C) following the head tag of the sheet size is an ID (e.g., binary data of one byte) of the sheet size.

Sheet types supported for the sheet size concerned, print quality levels supported for those sheet types, and information of layouts supported for the sheet size are inserted between the head tag and the end tag of the sheet size. More specifically, for example, the head tag (denoted by reference numeral 214 in FIG. 9C) of each sheet type is a prescribed code (e.g., "T") and its end tag (denoted by reference numeral 219 in FIG. 9C) is another prescribed code (e.g., "/"). Parameter-1 (denoted by reference numeral 215 in FIG. 9C) existing between the head tag and the end tag of the sheet type is an ID (e.g., binary data of one byte) of the sheet type. Parameter-2 following parameter-1 is an ID (e.g., binary data of one byte) of a print mode (print quality and layout). For example, in parameter-2, a first prescribed number of bits (e.g., 3 bits) represent print quality and a last prescribed number of bits (e.g., 1 bit) indicate whether borderless printing is possible. More specifically, for example, as for parameter-2, the nth (e.g., 0th) bit is set to "0" if "draft" is supported for the sheet type relating to parameter-2, the mth (e.g., 1st) bit is set to "1" if "normal" is supported for that sheet type, and the pth (e.g., 2nd) bit is set to "1" if "high" is supported for that sheet type. Further, the qth (e.g., 7th) bit is set to "1" if borderless printing is supported for the sheet size relating to parameter-2.

If plural sheet types are supported for a certain sheet size, sets of a sheet type head tag, parameter-1, parameter-2, and end tag are inserted between the head tag and the end tag of the sheet size in the same number as the number of sheet types supported.

For example, the above nest structure is such as to conform to the priority order of print conditions of the printer 15. For example, in the printer 15, as described later, the priority rank becomes higher in order of the print quality, layout, sheet type, and sheet size. The nest structure may be such as to conform to this priority order; that is, the sheet size is the outermost item and the sheet type, layout, and sheet quality are located inside the sheet size.

The printer driver 21 receives and analyzes the specification information having the nest structure shown in FIGS. 9B and 9C, whereby the printer driver 21 can recognize what sheet types are supported and what print layouts are possible for what sheet sizes and what print quality levels are supported for what sheet types.

Reference is now made to FIG. 8 again. The printer driver 21 stores, in the host storage area 19, the specification information received from the printer 15 (S11).

If a request for displaying a user interface (hereinafter abbreviated as "UI") from a user through the input device 5 ("yes" at step S12), the printer driver 21 displays a UI (the term "print parameter selection window) will be hereinafter used) for having a print parameter desired by the user specified for each of the various print condition items from the specification information stored in the host storage area 19 (S13).

FIG. 10 shows the structure of an exemplary print parameter selection window 80.

For example, the print condition items are the sheet size, sheet type, print quality, and layout. A menu (e.g., pull-down menu) for allowing selection of a print parameter for each of the various print condition items is displayed on the print parameter selection window 80. The printer driver 21 can control the information to be displayed (i.e., print parameters to be displayed in a selectable manner) of the menu for each of the various print condition items.

Assume that, for example, the sheet size, sheet type, layout, and print quality are set as priority order (descending order) in the printer driver 21. In this case, if a certain sheet size parameter is selected from one or more sheet size parameters included in the specification information 34, the printer driver 21 displays sheet type parameters relating to the selected sheet size parameter in the sheet type menu in a selectable manner and displays layout parameters relating to the selected sheet size parameter in the layout menu in a selectable manner. The printer driver 21 does not display, in a selectable manner, parameters that are not supported for the selected sheet size parameter (e.g., parameters that are not inserted between the head tag and the end tag of the selected sheet size. Likewise, if a certain sheet type parameter is selected, the printer driver 21 displays print quality parameters corresponding to the selected sheet type parameter in the print quality menu in a selectable manner.

The printer driver 21 may receive a priority order setting from a user. For example, if a setting that highest priority is given to the sheet type is made, the following procedure may be employed. That is, the printer driver 21 displays all of plural sheet type parameters included in the specification information 34 in a selectable manner. If a certain sheet type parameter is selected from those sheet type parameters, the printer driver 21 displays sheet size parameters corresponding to the selected sheet type parameter in a selectable manner.

As described above, when receiving specification information 34 from the printer 15, the printer driver 21 displays print parameters in a selectable manner on the basis of the received specification information 34. Therefore, print parameters supported by the printer 15 can necessarily be selected and a relationship among print parameters selected for the respective print condition items (e.g., a relationship among parameters of the sheet size, sheet type, print quality, and layout) can be made such as to be supported by the printer 15.

Where the printer 15 is not configured so as to perform a bidirectional communication, the printer driver 21 cannot receive specification information from the printer 15.

In this case, the printer driver 21 can control the information to be displayed of the print parameter menu for each of the various print condition items on the basis of a prescribed print parameter groups 26 being held therein as a result of advance storage. The prescribed print parameter groups 26 may also have a nest structure like specification information 34 to be received from the printer 15. The structure of the prescribed print parameter groups 26 and print parameters included therein do not accommodate all types of printers. Therefore, a relationship among print parameters for the respective print condition items may not be supported by the printer 15. In this case, the printer 15 can produce a print result that is close to a result required by a user by performing correction processing (described later in detail).

Reference is now made to FIG. 8 again. If a print execution instruction is received from the user after print parameters have been selected for the respective print condition items through the print parameter selection window 80 (S14), the printer driver 21 performs print processing using the selected print parameters (S15). If a print execution instruction is received (S14) without having print parameters selected through the print parameter selection window 80 or without displaying the print parameter selection window 80 ("no" at step S12), the printer driver 21 performs print processing using default print parameters (S15).

The process executed in the printing system according to the embodiment has been outlined above.

In this printing system, the printer driver 21 need not be such as to correspond to each type of printer and can be what is called a general-purpose driver. Therefore, where the printer 15 performs a bidirectional communication, the printer driver 21 can inquire of the printer its specification, receive specification information that is transmitted from the printer 15 as a response, and perform print processing using print parameters in the received specification information. As such, the printer driver 21 can perform print processing that is suitable for the specification of any type of printer 15 connected to the host apparatus 1 by receiving specification information from the printer 15.

If it is found that the printer 15 does not perform a bidirectional communication, the printer driver 15 does not inquire of the printer 15 its specification. Even if the printer 15 is a unidirectional printer, the printer driver 21 can perform print processing using print parameters in the print parameter groups 26 being held as a result of advance storage.

Print processing is performed at step S15 in the case where it was judged at step S7 (see FIG. 7) that the printer 15 is classified into item (a) or (b). Therefore, at step S15, print processing is performed in the particular mode and commands described in the particular language are transmitted from the printer driver 21 to the printer 15 during that course.

FIG. 11A shows an exemplary format of a command that is described in the particular language.

A command described in the particular language (hereinafter referred to as "particular language command") has a header field 251, a class field 253, a parameter length field 255, a command name field 257, and a parameter block field 259. The data size of the entire particular language command may be variable.

The header field 251 has a prescribed size (e.g., 1 byte). For example, prescribed header information is described in the header field 251 in a prescribed format.

The class field 253 has a prescribed size (e.g., 1 byte). Class information (e.g., ID) indicating one of plural classes relating to the particular mode is registered in the class field 253 in, for example, a prescribed format (e.g., ASCII code). The printer 15 can recognize what class a received particular language command belongs by referring to the class information written in the class field 253.

The parameter length field 255 has a prescribed size (e.g., 4 bytes). Data indicating a data length of a parameter block registered in the parameter block field 259 is registered in the field 255. The data may be in little endian form, for example.

The command name field 257 has a prescribed size (e.g., 4 bytes). Data indicating a command name is registered in the field 257. The printer 15 can recognize a received particular language command on the basis of the command name written in the field 257 and the class written in the class field 253.

The parameter block field 259 has a variable size. A parameter block is written in the field 259 and consists of one or plural parameter units. As for the parameter units, sizes of the values of respective parameters and their order are prescribed for each command. Where a numerical value of a prescribed number or more of bytes (e.g., 2 bytes) is used as a parameter value of each parameter unit, it is in big endian form unless specified in the definition of each particular language command.

Information to be written in each field will be described below in detail.

FIG. 11B shows exemplary classes to be written in the class field.

A class that has been selected by the printer driver 21 from plural kinds of classes relating to the particular mode is registered in the class field 253. For example, five kinds of classes, that is, "LUT" (look-up table), "quality," "job," "page," and "data," are prepared as plural kinds of classes relating to the particular mode.

The class "LUT" is a class indicating provision of a look-up table. A code (e.g., "1") representing the class "LUT" is set in the class field 253 when a look-up table is transmitted from the printer driver 21 to the printer 15. If a particular language command of this class and a certain look-up table are transmitted to the printer 15, the printer 15 uses the transmitted look-up table for prescribed image processing such as halftoning. On the other hand, no particular language command of this class is transmitted to the printer 15, the printer 15 uses a built-in default look-up table for image processing.

The class "quality" is a class indicating provision of a parameter relating to quality. A code (e.g., "q") representing "quality" is set in the class field 253 when a parameter is transmitted from the printer driver 21 to the printer 15. Exemplary parameters to be set as a parameter unit in a particular language command of the class "quality" are as follows:

(1) Sheet type ID (byte offset: 0; byte length: 1)
(2) Print quality (byte offset: 1; byte length: 1)
(3) Color/monochrome (byte offset: 2; byte length: 1)
(4) Lightness setting (byte offset: 3; byte length: 1)
(5) Contrast setting (byte offset: 4; byte length: 1)
(6) Saturation setting (byte offset: 5; byte length: 1)
(7) Color plane (byte offset: 6; byte length: 1)
(8) Pallette size (byte offset: 7; byte length: 2)
(9) Pallette data (byte offset: 8; byte length: length corresponding to a data size)

In this embodiment, the priority rank descends in order of "sheet type ID," "print quality," "color plane," "pallette size," and "pallette data."

"Sheet type ID" is an ID representing a sheet type. The sheet type may be any of various types such as a photographic sheet, a plain sheet, and a glossy sheet.

"Print quality" represents quality of an image as a print result, and is, for example, one of the above-described three kinds, that is, "draft," "normal," and "high."

"Color/monochrome" indicates whether black is expressed by three colors of cyan, magenta, and yellow or by only a black ink (monochrome).

"Lightness setting," "contrast setting," and "saturation setting" are parameters representing correction amounts on which to instruct the printer 15. Each of these settings may be made on a color-by-color basis by specifying a value in a range defined by a first value (e.g., −50) and a second value (e.g., +50). If a value smaller than the first value is set, the printer 15 performs a correction as if the first value were set. If a value larger than the second value is set, the printer 15 performs a correction as if the second value were set.

"Color plane" indicates a type of print data that are transferred to the printer 15. For example, "color plane" is "full color" or "256 colors." "Full color" means that the color of one pixel of RGB image data is expressed by 3 bytes, and "256 colors" means that it is expressed by 1 byte.

"Color pallette size" represents a color pallette size in the case where "color plane" is "256 colors." "Color pallette size" is set to "0" if "Color pallette size" is "full color."

"Color pallette data" is a data sequence of a color pallette having the data size that is set as "color pallette size." That is, where "256 colors" is set as "color plane," the printer driver 21 transmits, to the printer 15, a color pallette that is stored in a certain storage area (e.g., held by the printer driver 21). Where "color plane" is "full color," the printer driver 21 does not transmit color pallette data.

"Job" is a class indicating provision of a job parameter relating to a print job. When a particular language command having the class "job" is transmitted, for example, a code (e.g., "j") representing the class "job" is set in the class field 253 of the command and one of a code (e.g., "setj") indicating a start of a job and a code (e.g., "endj") indicating an end of the job is set in the command name field 257. If a code indicating a start of a job is set in a particular language command, plural kinds of job parameters such as shown in the following items (1)-(8) are set in the parameter units of the command:

(1) Fixed sheet width (byte offset: 0; byte length: 4)
(2) Fixed sheet length (byte offset: 4; byte length: 4)
(3) Top margin (byte offset: 8; byte length: 2)
(4) Left margin (byte offset: 10; byte length: 2)
(5) Print region width (byte offset: 12; byte length: 4)
(6) Print region length (byte offset: 16; byte length: 4)
(7) Input image density (byte offset: 20; byte length: 1)
(8) Bidirectional printing/unidirectional printing (byte offset: 21; byte length: 1)

"Fixed sheet width" represents a sheet width and "fixed sheet length" represents a sheet length. For example, the unit of these values is pixel (e.g., an inch number multiplied by 360 ppi (pixels per inch)). And these values are supported by the printer 15. More specifically, for example, a sheet width and a sheet length for each sheet size are stored in the printer driver 21 and the printer 15. If a certain sheet size is selected through the print parameter selection window 80 (see FIG. 10) or the like, the printer driver 15 determines the sheet width and the sheet length corresponding to the selected sheet size on the basis of the stored information and sets the determined sheet width and length (i.e., sets the sheet size in terms of its sheet width and length). The printer 15 generates print image data on the basis of the sheet width and length. If the thus-set sheet width and length have values not supported by the printer 15, the printer converts those sheet width and length to closest ones among the plural sets of a sheet width and a sheet length that are set in a storage area of the printer 15 and continues processing using the sheet width and length thus obtained.

"Top margin" represents a distance from the sheet top edge to top print dots, and "left margin" represents a distance from the sheet left edge to leftmost print dots. For example, the unit of these values is pixel (e.g., an inch number multiplied by an input image density (360 or 720 ppi)). The input image density is a resolution of RGB image data to be transmitted to the printer 15. On the other hand, an output resolution is a resolution of an image to be printed (i.e., a resolution of print image data) and, in other words, a print resolution.

"Print region width" and "print region length" represent a width and a length of print image data, respectively. For example, the unit of these values is pixel (e.g., an inch number multiplied by an input image density (360 or 720 ppi)).

"Input image density" represents an image density (in other words, resolution) of RGB image data to be transmitted to the printer 15. For example, in terms of (horizontal density)×(vertical density), "input image density" is one of two kinds: 360 ppi×360 ppi and 720 ppi×720 ppi. For example, the former is employed in a case that a print subject is an image and the latter is employed in both of a case that a print subject is an image and a case that it is text.

"Bidirectional printing/unidirectional printing" indicates which of bidirectional printing and unidirectional printing (described above) the printer 15 should perform.

"Page" is a class indicating provision of information relating to a page. When a particular language command having the class "page" is transmitted, for example, a code (e.g., "p" representing the class "page") is set in the class field 253 of the command and one of a code (e.g., "sttp" indicating a start of a page) and a code (e.g., "endp") indicating an end of the page is set in the command name field 257. If a code indicating an end of a page is set in a particular language command, information indicating whether the next page exists or not is set in the parameter unit of the command. If detecting information indicating that the next page exists, the printer 15 can perform an operation of feeding a sheet for the next page with prescribed timing (e.g., at the same time as the detection).

"Data" is a class indicating provision of RGB image data (e.g., RGB data of one raster). When a particular language command having the class "data" is transmitted, for example, a code (e.g., "d" representing the class "data") is set in the class field 253 of the command and plural kinds of data parameters are set in the parameter units. Exemplary data parameters are as follows:

(1) X offset (byte offset: 0; byte length: 2)
(2) Y offset (byte offset: 2; byte length: 2)
(3) Compression type (byte offset: 4; byte length: 1)
(4) Raster data size (byte offset: 5; byte length: 2)
(5) RGB raster data (byte offset: 7; byte length: length of RGB raster data themselves)

"X offset" is an X-coordinate (i.e., horizontal) offset from a page base point (e.g., top-left corner). For example, the unit is pixel. This parameter depends on the input image density, for example.

"Y offset" is a Y-coordinate (i.e., vertical) offset from the page base point (e.g., top-left corner). For example, the unit is pixel. This parameter depends on the input image density, for example. In this embodiment, RGB data are transferred raster by raster and hence the value of "Y offset" is incremented one by one.

"Compression type" is a compression type of RGB data of one raster. Plural compression types are available, that are non-compression and dot-sequential run-length compression, for example. The printer driver 21 performs dot-sequential run-length compression for RGB data of each raster and compares the data size of the uncompressed RGB data with that of compressed RGB data. The printer driver 21 transmits the uncompressed RGB data if the data size of the uncompressed RGB data is smaller, and transmits the compressed RGB data if the data size of the compressed RGB data is smaller. The printer driver 21 changes the parameter "compression type" to be set as the parameter unit in accordance with whether the RGB data were compressed or not.

"Raster size" represents a data size of RGB raster data.

"RGB raster data" is RBG raster data themselves. In the case of full color, one pixel is expressed by data of 3 bytes that are arranged in order of R, G, and B. In the case of 256 colors, one pixel is expressed by data of 1 byte.

As for the class "data," the printer driver 21 does not transmit RGB data of the same raster two or more times. If the printer driver 21 transmits RGB data of the same raster two or more times, the printer 15 reads but discards a command in which the second or ensuing RGB data are set.

As for the class "data," in a particular language command having the t class "data," the printer driver 21 does not set the value of "Y offset" to a value (e.g., "4") that precedes the immediately preceding value (e.g., "5"). If a command is transmitted with the value of "Y offset" set to a value that precedes the immediately preceding value, the printer 15 performs, for example, an operation of reading but discarding the command.

The particular language command has been described above. Particular language commands are transmitted from the printer driver 21 to the printer 15 at step S15 shown in FIG. 8.

FIG. 12 shows an example of a specific process that corresponds to the print processing that is performed at step S15 shown in FIG. 8.

As shown in FIG. 12, in the print processing of step S15, steps A-R, for example, are executed in this order. Each step will be described below in detail.

(1) Step A

Where the printer 15 performs a bidirectional communication, as described above, the printer driver 21 transmits a specification information acquisition command to the printer 15 in a format that conforms to the D4 protocol. In response to the command, the printer 15 transmits specification information having a nest structure to the printer driver 21. At this time, in the printer 15, a port relating to the D4 protocol is opened.

On the other hand, where the printer 15 performs a unidirectional communication rather than a bidirectional communication, as described above, the printer driver 21 cannot be informed of the specification of the printer 15. Among unidirectional printers are ones having a D4 protocol layer and ones not having it. Therefore, where the printer 15 is a unidirectional printer, the printer driver 21 cannot recognize whether the printer 15 has a D4 protocol layer.

In view of the above, first, the printer driver 21 generates a command for causing the printer 15 to cancel the D4 protocol (hereinafter referred to as "D4 protocol cancellation command") and transmits it to the printer 15.

If the port relating to the D4 protocol is opened because the printer 15 is configured so as to perform a bidirectional communication, the printer 15 reads but discards the D4 protocol cancellation command and does not cancel the D4 protocol. Where the printer 15 performs a bidirectional communication, the printer driver 21 can communicate with the printer 15 in the D4 protocol layer, no problems occur even if the command is read but discarded by the printer 15.

On the other hand, where the printer 15 is a unidirectional printer and has a D4 protocol layer, the printer 15 cancels the D4 protocol. If not having a D4 protocol layer, the printer 15 reads but discards the D4 protocol cancellation command. In either case, the printer driver 21 can communicate with the unidirectional printer 15 without using the D4 protocol layer with an assumption that the printer 15 does not have a D4 protocol layer.

(2) Step B

After transmitting the D4 protocol cancellation command, the printer driver 21 transmits an initialization command (e.g., a command including a code "ESC@") to the printer 15 with certain timing (e.g., when a prescribed response to the D4 protocol cancellation command is received from the printer 15). In response to the initialization command, the printer 15 performs prescribed initialization processing. In the initialization processing, the printer 15 performs such processing as returning the print parameters set in the printer storage area 33 to initial (default) parameters.

(3) Step C

After transmitting the initialization command, the printer driver 21 transmits a command for causing the printer 15 to make a transition to the remote mode (hereinafter referred to as "remote transition command") to the printer 15 with certain timing (e.g., when a prescribed response to the initialization command is received). In response to the remote transition command, the printer 15 makes a transition from the legacy mode to the remote mode.

At step C, the printer driver 21 may first transmit a command for causing the printer 15 to make a transition to the legacy mode (hereinafter referred to as "legacy transition command") and then (e.g., after reception of a prescribed response) transmit a remote transition command. In this case, if the printer 15 is in a mode other than the legacy mode, the printer 15 makes a transition to the legacy mode in response to the legacy transition command. If the printer 15 receives the legacy transition command in a state that it is already in the legacy mode, the printer 15 can read but discard the command.

(4) Step D

The printer driver 21 transmits a command meaning a start of a legacy mode job (hereinafter referred to as "legacy job start command") to the printer 15 with certain timing (e.g., after a mode transition completion notice is received from the printer 15 in response to the remote transition command). In response to the legacy job start command, the printer 15 sets a job start in the printer storage area 33 (or the buffer 133). From this time onward, until reception of a command meaning an end of the legacy mode job (hereinafter referred to as "legacy job end command"), the printer 15 recognizes that commands and data received relate to one legacy mode print job.

In the legacy mode, for example, commands and data flow from the printer driver 21 into the printer 15 in streams and stored in the printer storage area 33 one after another. Therefore, if no proper measure is taken, it is impossible to recognize which part of the printer storage area 33 commands and data relating to the one print job occupy.

In view of the above, before transmitting commands and data in the legacy mode, the printer driver 21 causes the printer 15 to switch the language processing mode to the remote mode (i.e., a mode other than the legacy mode) and informs, in the remote mode, the printer 15 of a start or an end of a job. As a result, even if the printer 15 has received and stored commands and data in streams in the legacy mode, the printer 15 can recognize which part of the printer storage area 33 the commands and data relating to the one print job occupy.

(5) Step E

The printer driver 21 transmits a legacy transition command to the printer 15 with certain timing (e.g., when a setting completion notice is received in response to the legacy job start command). In response to the legacy transition command, the printer makes a transition from the remote mode to the legacy mode.

In this embodiment, the legacy transition command means both of cancellation of the remote mode and transition to the legacy mode. Alternatively, a legacy transition command may be transmitted after transmission of a command for canceling the remote mode.

(6) Step F

The printer driver 21 transmits a command for causing the printer 15 to make a transition to the particular mode (hereinafter referred to as "particular mode transition command") to the printer 15 with certain timing (e.g., when a notice of completion of the transition to the legacy mode is received from the printer 15). In response to the particular mode transition command, the printer 15 makes a transition from the legacy mode to the particular mode.

(7) Step G

Steps G-M are steps in which processing is performed in the particular mode (enclosed by broken line in FIG. 12). Commands and data that are transmitted in the particular mode flow into the printer 15 in streams. The printer 15 stores the commands and data that are transmitted in streams in the buffer 133 one after another.

At step G, the printer driver 21 generates a particular language command relating to the class "LUT" (hereinafter referred to as "LUT command") and transmits the generated LUT command to the printer 15. The printer driver 21 can transmit an LUT using the LUT command. When receiving the LUT, the printer 15 performs image processing (e.g., halftoning or a color conversion) using the LUT. When receiving no LUT, the printer 15 performs image processing using an LUT (not shown) that is held in the printer storage area 33 as a result of advance storage.

(8) Step H

After transmitting the LUT command, the printer driver 21 transmits a particular language command relating to the class "quality" (hereinafter referred to as "quality command") to the printer 15. As described above, the printer driver 21 transmits a quality command in which such parameters as a sheet type ID and print quality are set. As for the sheet type ID and the print quality among the parameters to be set in the quality command, the printer driver 21 can set parameters (e.g., a sheet type parameter and a print quality parameter) that have been selected by a user through the print parameter selection window 80.

The printer 15 extracts the various print parameters that are set in the received quality command and writes the extracted print parameters in the printer storage area 33.

(9) Step I

After transmitting the quality command, the printer driver 21 transmits a particular language command relating to the class "job" and meaning a start of a job (hereinafter referred to as "particular job start command") to the printer 15. As described above, the printer driver 21 transmits a particular language command in which such parameters as information relating to a sheet size (fixed sheet width and fixed sheet length) and information relating to a print region (top margin, left margin, print region width, and print region length). As for the information relating to a sheet size and the information relating to a print region, the printer driver 21 can perform calculations on the basis of parameters (e.g., a sheet size parameter and a layout parameter) that have been selected by the user through the print parameter selection window 80 and set calculated information.

In response to the particular job start command, the printer 15 sets a particular mode job start in the printer storage area 33 (or the buffer 133). From this time onward, until reception of a command meaning an end of the particular mode job (hereinafter referred to as "particular job end command"), the printer 15 can recognize that commands and data received relate to one particular mode print job.

When step I has completed, the plural parameters that are necessary for processing to be performed by the printer 15 are set. However, it is not necessarily the case (particularly in the case where the printer 15 is a unidirectional printer) that all the parameters thus set are supported by the printer 15. Therefore, parameters that are not supported by the printer 15 among the parameters thus set need to be corrected to parameters supported by the printer 15. For example, the printer 15 can perform processing of such corrections with arbitrary timing in a period from the end of step I to a time point when RGB data of one page are stored in the printer 15 and print image data are generated on the basis of the RGB data of one page.

In the printer 15, the priority order of the print condition items relating to the parameter corrections is stored in the printer storage area 33. For example, the priority rank of the print condition items descends in order of the sheet size, sheet type, layout, and print quality. A criterion for setting this priority order is determined from a prescribed viewpoint that, for example, in the particular mode of this embodiment the printer driver 21 performs layout of an image and outputs a resulting image in contrast to the fact that the printer 15 performs layout of an image in what is called direct printing in which printing is performed by reading RGB images from a memory card or the like. That is, the above priority order is determined to allow the printer 15 to perform printing with a minimum probability of errors even if the printer driver 21 performs layout on RGB image data. For example, the layout performed by the printer driver 21 is an operation of adjusting the size of an image having a prescribed resolution (in ppi) that is output from the application software 22 by increasing or decreasing the number of pixels per unit length on the basis of a sheet size and a layout desired by the user.

The printer 15 can correct the parameters according to the above-mentioned priority order.

For example, if the information (e.g., fixed sheet width and fixed sheet length) relating to a sheet size that is sent from the printer driver 21 does not coincide with any information relating to the sheet size that is supported by the printer 15, the printer 15 corrects the information relating to a sheet size that is sent from the printer driver 21 to information relating to a maximum sheet size that is supported by the printer 15.

For example, if no match is found for the information (e.g., sheet type ID) relating to a sheet type though a match is found for the information relating to a sheet size, the printer 15 corrects the information relating to a sheet type that is sent from the printer driver 21 to information relating to a sheet type that is supported by the printer 15 (this information needs to be consistent with the information relating to a sheet size for which a match is found. A more specific description will be made with reference to FIG. 2. If pieces of information of a sheet size "L-size" and a sheet type "glossy sheet" are received from the printer driver 21, one choice the printer 15 can make to employ the sheet type "glossy sheet" is to change the sheet size to "A4," for example. Instead, the printer 15 employs the sheet size "L-size" with priority given to it and corrects the information of the sheet type "glossy sheet" that is received from the printer driver 21 to a sheet type "photographic sheet" that is consistent with the sheet size "L-size." If plural sheet types are available that are consistent with the sheet size "L-size," the printer 15 can select one sheet type automatically or in response to a manual input of the user and corrects the sheet type of the command sent from the printer driver 21 to the selected sheet type.

Then, if necessary, the printer 15 corrects the layout and print quality according to the priority order in the same manner as does the sheet type. For example, in making a correction from "bordered" to "borderless," the printer 15 can also make a correction of enlarging the print region. Conversely, in making a correction from "borderless" to "bordered," the printer 15 can also make a correction of reducing the print region (or cutting away end portions having prescribed widths of the print region so as to produce necessary margins). For example, in correcting the print quality "draft," the printer 15 can give a higher priority to "normal" than to "high." In correcting the print quality "normal," the printer 15 can give a higher priority to "high" than to "draft." In correcting the print quality "high," the printer 15 can give a higher priority to "normal" than to "draft." (That is, the printer 15 can make a correction to print quality that is as close to the print quality of the command sent from the printer driver 21 as possible).

(10) Step J

After transmitting the particular job start command, the printer driver 21 transmits a particular language command meaning a start of a page (hereinafter referred to as "page start command") to the printer 15. In response to the page start command, the printer 15 sets a page start in the printer storage area 33 (or buffer 133). From this time onward, until reception of a particular language command meaning an end of the page (hereinafter referred to as "page end command"), the printer 15 recognizes that commands and data received relate to one particular mode page. The printer 15 may start a sheet feed immediately after the reception of the page start command.

(11) Step K

After transmitting the page start command, the printer driver 21 transmits a data command having RGB data of one raster to the printer 15. The printer driver 21 continues to transmit data commands until transmission of RGB raster data of one page is finished. In doing so, as described above, the printer driver 21 compares the data size of uncompressed RGB raster data with that of compressed data and transmits the RGB raster data having a smaller data size. The printer 15 stores received data commands in the buffer 133 one after another. If RGB raster data of a prescribed number of rasters (e.g., RGB raster data of one page) have been stored, the printer 15 may process the stored RGB raster data on the basis of the various kinds of parameters that are set in the printer storage area 33. If the received RGB raster data are not sufficient for the print region specified in advance (e.g., if the length of the print region formed by the actually received RGB raster data is shorter than that of the print region of the command from the printer driver 21), the printer 15 may judge that blank data have been transmitted as the remaining data.

(12) Step L

After transmitting the RGB raster data of one page, the printer driver 21 transmits a page end command in which next page presence/absence information indicating whether the next page exists or not.

In response to the page end command, the printer 15 sets a page end in the printer storage area 33 (or buffer 133). In response to the page end command, the printer 15 may refer to the next page presence/absence information and start a next sheet feed if the next page exists or perform prescribed end processing if the next page does not exist.

If one job includes n pages, steps J, K, and L are executed n times repeatedly.

(13) Step M

After transmitting the page end command of the last page, the printer driver 21 transmits a particular job end command to the printer 15.

In response to the particular job end command, the printer 15 sets an end of the particular mode job in the printer storage area 33 (or buffer 133). When receiving the particular job end command, the printer 15 may read all the data stored in the buffer 133 (or printer storage area 33) and perform sheet ejection processing if sheet ejection has not completed yet.

(14) Step N

For example, after transmitting the particular job end command, the printer driver 21 transmits a legacy transition command to the printer 15. In response to the legacy transition command, the printer 15 makes a transition from the particular mode to the legacy mode.

In this embodiment, the legacy transition command means both of cancellation of the particular mode and transition to the legacy mode. Alternatively, a legacy transition command may be transmitted after transmission of a command for canceling the particular mode.

(6) Step O

The printer driver 21 transmits a remote transition command to the printer 15 with certain timing (e.g., a prescribed response to the legacy transition command is received). In response to the remote transition command, the printer 15 makes a transition from the legacy mode to the remote mode.

(16) Step P

The printer driver 21 transmits a legacy job end command to the printer 15 with certain timing (e.g., when a notice of completion of the mode transition is received from the printer 15 in response to the remote transition command). In response to the legacy job end command, the printer 15 sets a job end in the printer storage area 33 (or buffer 133).

(17) Step Q

The printer driver 21 transmits a legacy transition command to the printer 15 with certain timing (e.g., when a notice of completion is received in response to the legacy job end command). In response to the legacy transition command, the printer 15 makes a transition from the remote mode to the legacy mode.

In this embodiment, the legacy transition command means both of cancellation of the remote mode and transition to the legacy mode. Alternatively, a legacy transition command may be transmitted after transmission of a command for canceling the remote mode.

(18) Step R

The printer driver 21 transmits an initialization command (e.g., a command including a code "ESC@") to the printer 15 with certain timing (e.g., when a prescribed response to the legacy transition command is received from the printer 15). In response to the initialization command, the printer 15 performs prescribed initialization processing. In the initialization processing, the printer 15 performs such processing as returning the print parameters that were set in the printer storage area 33 in the particular mode to the initial (default) parameters.

The print processing of step S15 (see FIG. 8) has been described above. In this print processing, in the particular mode, the transmission order (e.g., in a nest structure) of commands relating to the plural classes is determined in advance. If receiving commands in different order from this transmission order (e.g., a new page start command is received before reception of a page end command), the printer 15 reads but discards that command.

To cause the printer 15 to carry out a new print job described in the particular language, after transmitting a particular job end command, the printer driver 21 may transmit a particular job start command without canceling the particular mode. That is, steps I-M may be executed repeatedly in the particular mode without making a transition to the legacy mode.

In the above-described embodiment, the printer driver 21 is configured so as to be able to transmit RGB image data. Further, the host apparatus 1 detects which of a unidirectional communication and a bidirectional communication the printer 15 performs and whether the printer 15 supports the particular language. If recognizing that the printer 15 performs a bidirectional communication and supports the particular language, the printer driver 21 inquires of the printer 15 its specification and transmits, to the printer 15, print commands containing parameters included in specification information that is transmitted from the printer 15 in response to the inquiry. In this case, since the printer 15 receives print commands that are based on its own specification information, the printer 15 can process the print commands reliably. It is concluded from the above discussion that it is not necessary to construct printer drivers 21 for respective types of printers 15 and a general-purpose printer driver 21 can be used.

Incidentally, in the above-described embodiment, the printer 15 performs printing in such a manner that the processor 35 reads the plural modules constituting the print paths, the DPC 131 for managing the plural modules, and other components and performs processing. And the processing is performed on the basis of the configuration and the functions of the software group 37. Therefore, the configuration and the functions of the software group 37 of the printer 15 will be described first with reference to FIGS. 13A-13D to FIG. 15 and then a detailed process that is executed by the printer 15 will be described with reference to FIGS. 16-18.

FIG. 13A shows the configuration of an example of the software group.

The software group 37 may have a hierarchical structure as shown in FIG. 13A. For example, an operating system (OS) 333 exists in the lowest layer and various hardware control modules 331 for controlling various kinds of hardware (e.g., I/F 13 and engine controller 41) of the printer 15 are provided above the OS 333. A module group 335 is located above the various hardware control modules 331. The DPC 131 for constructing a print path by selecting necessary modules from the module group 335 and necessary ones from the hardware control modules 331 is located above the module group 335. A function 327, a service 323, and a user interface (UI) 321 are arranged in this order (ascending order) above the DPC 131.

The function 327 is provided to realize a group of functions that are different from original functions of the printer 15. For example, the function 327 is called in reading an image from a memory card that has been inserted into the additional I/F 71.

Cooperating with the UI 321, for example, the service 323 receives a request from an operating panel (not shown) of the printer 15 or a request from an external device (e.g., host apparatus 1 or additional device 73) and starts one of various kinds of processing. For example, when receiving a request externally via the UI 321, the service 323 can call the function 327, the DPC 131, or other modules using a prescribed harness in a harness group 325. The reason why units called "harnesses" that are classified by function are provided is that the printer 15 incorporates, in addition to various functions that are performed simply by software, the IFD 101 relating to those functions, a status management module DSM for managing the statuses of various kinds of hardware, and other components. Providing the units called "harnesses" that are classified by function makes it possible to call modules from the software modules using the DPC 131.

An event as described below can cause the DPC 131 to start its operation. For example, when a prescribed event (e.g., a user's manipulation through the UI 321 or reception of a command from the host apparatus 1) has been detected and the service 323 has selected a harness corresponding to a piece of hardware relating to the event (e.g., the I/F 13 that has received the command) from the harness group 325 (located under the service 323) and has called it, the call of the harness can cause the DPC 131 to start its operation. When viewed from the layers above the DPC 131, various application interfaces (e.g., functions (e.g., "LockProcess") for causing the DPC 131 to secure modules) are defined for the DPC 131. The layers above the DPC 131 control the DPC 131 using a desired application interface (hereinafter abbreviated as "API"). The DPC 131 starts its operation when called by one of the harnesses that are units classified by function and constructs a combination of modules that are necessary for realizing processing required by the harness.

Supplementally, for example, the service 323 can hold plural print applications for respective types of printers 15 in the form of function modules including a harness function. For example, where the printer 15 has a scanner and has what is called a copy function of printing an image that is scanned in by the scanner, function modules for the copy function can be placed under the management of the service 323. Where the printer 15 has a function of reading RGB image data from a memory card and printing those data, function modules for such card printing can be placed under the management of the service 323. A harness of the I/F 13 for receiving data from the host apparatus 1 can also be placed under the management of the service 323 as a function as in the above examples. Therefore, an API that is defined for the DPC 131 can be caused to operate according to its procedure in such a manner that the service 323 instructs each function (which may be regarded as a harness) to execute modules and the instructed function specifies a print path defined by the DPC 131 (e.g., informing the DPC 131 of a print processing ID). In this manner, print processing corresponding to one application can be performed.

FIG. 13B shows an example of the module group 335 that is controlled by the DPC 131.

The module group 335 has one or more modules that are classified into a module type "initiator" (hereinafter referred to as "initiator modules"), one or more modules that are classified into a module type "terminator" (hereinafter referred to as "terminator modules"), and one or more modules that are classified into a module type "member" (hereinafter referred to as "member modules"). The initiator modules (e.g., data acquisition module 103) are prescribed as modules that should be located at the head of a print path. The terminal modules are prescribed as modules that should be located at the end of a print path. The member modules are prescribed as modules that should be located between an initiator module and a terminator module.

Information indicating into which module types the modules of the module group 335 are classified (e.g., correspondence between module IDs and the module types) is registered in a prescribed location (e.g., the DPC 131 or another location in the printer storage area 33). By referring to this information, the DPC 131 can recognize into which module types the modules of the module group 335 are classified.

The arrangements of an initiator module, member modules, and a terminator module are determined in advance for respective pieces of print processing to be realized. More specifically, as shown in FIG. 13C, module arrangements (e.g., module IDs arranged in order from the head to the end) are correlated with print processing IDs for identification of pieces of print processing and the IDs of harnesses that are called in performing the pieces of print processing, respectively. Information relating to the module arrangements (e.g., correspondence between the module arrangements, the print processing IDs, and the IDs of the harnesses to be called) is registered in a prescribed location (e.g., the DPC 131 or another location in the printer storage area 33). By referring to this information, the DPC 131 can recognize what harness should be called and what print path should be constructed in performing what print processing.

In this embodiment, each module (in particular, each module in the module group 335) has several statuses and transitions between those statuses occur in the following manner, for example.

FIG. 13D shows how transitions between the statuses of each module occur.

For example, the statuses of each module are "standby," "ready," and "processing." "Standby" means that the module can be called by the DPC 131.

"Ready" means that the module has been rendered in a state that it can carry out a job as a result of calling from the DPC 131 in the "standby" status using a G-READY function (described later). "Processing" means that the module has been rendered in a state that it is carrying out a job as a result of reception of a START-J function (described later) from the DPC 131 in the "ready" status. The module returns to the "ready" status if it receives a job end instruction while it is in the "processing" status. The module returns to the "standby" status if it receives a cancellation instruction while it is in the "ready" status.

Next, exchange of data between modules will be described.

FIG. 14A shows a function of each module.

Each module has a function for the downstream module (in other words, a function of the module as an upstream module) and a function for the upstream module (in other words, a function of the module as a downstream module). The function for the downstream module is:

(A) RP (read providing): function of providing a stream read function; or (B) WC (write call): function of calling a stream write function.

On the other hand, the function for the upstream module is:

(a) RC (read call): function of calling a stream read function; or (b) WP (write providing): function of providing a stream write function.

A print path, that is, a path along which a stream should flow (in other words, a flow of data processing), is constructed in such a manner that two or more modules selected from the module group 335 by the DPC 131 are arranged in a manner specified by the DPC 131. During that course, each module exchange data using the stream read function for reading data prepared by the upstream module or the stream write function for writing data to the downstream module.

When the downstream module tries to read data from the upstream side, the upstream module that has prepared the data should know a location (pointer position) of the data. On the other hand, when the upstream module tries to write data to the downstream module, the downstream module that is to receive the data should know a data write location (pointer position).

The present applicant has paid attention to this point. This embodiment provides a mechanism that enables data exchange irrespective of the combination of modules by discriminating between the side of providing a stream read function or a stream write function and the side of actually performing data reading or writing using it. FIG. 14A shows combination of those functions.

FIG. 14B shows functions of an initiator module, a member module, and a terminator module.

The member module has one of the functions "RC" and "WP" of an upstream module and one of the functions "RP" and "WC" of a downstream function, and hence can be any of four kinds of modules in total as shown in FIG. 14B. What functions modules should have can be determined by kinds of processing that the modules are to perform, respectively. However, it is preferable that, for example, a module of such a type as to store data in a buffer as a result of its internal processing be designed as a module having the function "WC."

The initiator module is located at the head of a data processing flow and hence has no upstream module. Therefore, the initiator module need not have the function "RP" or "WC" for an upstream module; it is sufficient for the initiator module to have the function "RC" or "WP" for a downstream module.

The terminator module is located at the end of a data processing flow and hence has no downstream module. Therefore, the terminator module need not have the function "RC" or "WP" for a downstream module; it is sufficient for the terminator module to have the function "RP" or "WC" for an upstream module.

When instructed by a harness to perform prescribed print processing, the DPC 131 refers to information (e.g., a table) as exemplified in FIG. 13C and determines modules to be combined together according to the print path definition in the information. Then, the DPC 131 calls a G-READY function for each module and thereby reserves use of each module. If being in such a state as to be able to response to the call from the DPC 131, each module returns the G-READY function after inserting the following values therein as arguments. When the DPC 131 calls a G-READY function, four arguments [X1, IX1, Y1, and IY1] are given, the details of which are as follows:

(1) X1: Argument that is returned from an initiator module or a member module having the function "RP" for a downstream module after being set to a pointer of a stream read function provided by itself. A terminator module or a member module having the function "RC" for an upstream module returns this argument after setting it to "null." "Null" is a variable meaning that nothing is specified.

(2) IX1: Argument that is returned from an initiator module or a member module having the function "RP" for a downstream module after being set to a context ID that should be specified when a stream read function provided by itself is called. A terminator module or member module having the function "RC" for an upstream module returns this argument after setting it to "0." The reason why each module returns the context ID is that the same module may be used for two kinds processing simultaneously. In this case, in instructing each module on a start or end of processing, the DPC 131 indicates, using the context ID, which of the start and end of processing is intended.

(3) Y1: Argument that is returned from a member module or a terminator module having the function "WP" for an upstream module after being set to a pointer of a stream write function provided by itself. An initiator module or a member module having the function "WC" for a downstream module returns this argument after setting it to "null."

(4) IY1: Argument that is returned from a member module or a terminator module having the function "WP" for an upstream module after being set to a context ID that should be specified when a stream write function provided by itself is called. An initiator module or a member module having the function "WC" for a downstream module returns this argument after setting it to "0".

FIG. 15 shows an exemplary data processing flow in a print path. To facilitate understanding of the description, each module that provides a stream read function or a stream write function is hatched in FIG. 15. In this example, the print path is an RGB print path and an initiator module I-A (particular language processing module 113) having "RP," a member module M-E (color conversion/halftoning module 115) having "RC" and "WC," a member module M-H (interlace processing module 117) having "WP" and "RP," and a terminator module T-A having "RC" are arranged in this order from the head to the end.

When a G-READY function is called by the DPC 131, the initiator module I-A, which is to provide a stream read function, returns a pointer SR1 and a context ID (RID1) of the stream read function as effective arguments to the DPC 131 according to the above-described definition of the G-READY function. The member module M-E returns no effective arguments because there is no function to be provided by itself. The member module M-H, which is to provide a stream read function and a stream write function, returns a pointer SR2 for the downstream module and a context ID (RID2) of the stream read function, a pointer SW1 for the upstream module, and a context ID (WID1) of the stream write function as arguments. The terminator module T-A returns no effective arguments because there is no function to be provided by itself.

After receiving the above arguments, the DPC 131 instructs each module to start data processing by calling a START-J function for each module with timing that is appropriate for the data processing. At this time, the START-J function is given arguments [U1, IU1, V1, IV1], the details of which are as follows:

(1) U1: Gives a pointer of a stream read function used by a module. The pointer of the stream function is provided by the upstream initiator module or member module having "RP." In calling a START-J function, a terminator module or a member module having "WP" should set this argument to "null."

(2) IU1: Is a context ID that should be specified by a module that uses a stream read function. This context ID is provided by the upstream initiator module or member module having "RP." In calling a START-J function, a terminator module or a member module having "WP" should set this argument to "0."

(3) V1: Gives a pointer of a stream write function used by a module. The pointer of the stream function is provided by the downstream terminator module or member module having "WP." In calling a START-J function, an initiator module or a member module having "RP" should set this argument to "null."

(4) IV1: Is a context ID that should be specified by a module that uses a stream write function. This context ID is provided by the downstream terminator module or member module having "WP." In calling a START-J function, an initiator module or a member module having "RP" should set this argument to "0."

According to the above rules, the arguments are passed to each module in calling a START-J function. That is, for a stream read function, a pointer provided by an upstream module is passed to a downstream module. For a stream write function, a pointer provided by a downstream pointer is passed to an upstream module. As a result, as shown on the right side in FIG. 15, when using a stream read function, each module (downstream module) reads out data using a pointer provided by the upstream module. When using a stream write function, each module (upstream module) writes data using a pointer provided by the downstream module. In this manner, each module can exchange data smoothly even if it does not know conditions relating to writing of data owned by itself or reading of data from a cooperating module until being called by the DPC 131.

The configuration and the functions of the software group 37 of the printer 15 have been described above. Next, an exemplary process that is executed by the printer 15 on the basis of the configuration and functions of the software group 37 will be described.

FIGS. 16-18 show a series of steps that are executed by the printer 15 as it receives a command described in the legacy language and then a command described in the particular language.

When the I/F 13 of the printer 15 has received a command from the host apparatus 1 (S21), the IFD 101 calls a first API of a harness 303 (hereinafter referred to as "IF harness") that belongs to the harness group 3215 and corresponds to the I/F 13 and sends a data arrival notice to the IF harness 303 (S22). The IF harness 303 has plural APIs, and the IFD 101 is configured so as to call the first API among the plural APIs at step S21.

In response to reception of the data arrival notice, the IF harness 303 calls a prescribed API among one or more APIs of the service 323 and sends a data arrival notice to the service 323 (S23).

The service 323 performs exclusiveness management on a print path of the printer 15. For example, where a print path for direct printing is already constructed, the service 323 is in a busy state so as not to construct another print path. Where no print path is already constructed, the service 323 is in an idle state. If being in a busy state, the service 323 returns an error notice to the IF harness 303. On the other hand, If being in an idle state, the service 323 calls a second API of the IF harness 303 and sends a print start notice (call-back function) to the IF harness 303 (S24). The service 323 is configured so as to call the second API of the IF harness 303 in sending a print start notice in response to a data arrival notice coming from the IF harness 303. The second API called is executed, whereby the following steps S25 and S28, for example, are executed.

The IF harness 303 issues, to the DPC 131, an ID of print processing and a request for securing modules to constitute a print path for the print processing (S25). Steps S21-S25 have been executed in response to reception of the command transmitted from the host apparatus 1, and it is highly probable that the received command is described in the legacy language. Therefore, at step S25, the IF harness 303 issues "legacy language mode printing" to the DPC 131 as the print processing ID.

In response to the print processing ID and the module securing request, the DPC 131 determines a print path definition corresponding to the received print processing ID by referring to the invention shown in FIG. 13C and starts to construct a print path indicated by the determined print path definition. In this case, the DPC 131 starts to construct a legacy path because it has received "legacy language mode printing" as the print processing ID. The DPC 131 employs the data acquisition module 103 (initiator module I-B) and the legacy language processing module 105 (terminator module T-B) as modules to constitute a legacy path on the basis of the information shown in FIG. 13C, and calls each of those modules using a G-GREEN function (S26 and S27). As a result, the called data acquisition module 103 and legacy language processing module 105 make a transition from the "standby" status to the "ready" status.

Then, the IF harness 303 requests the DPC 131 to perform print processing (S28). In response to the request, the DPC 131 sends a START-J function to the data acquisition module 103 and the legacy language processing module 105 (S29 and S30). Receiving the START-J function, the data acquisition module 103 and the legacy language processing module 105 make a transition from the "ready" status to the "processing"

status. A legacy path is thus constructed. At this time, the legacy language processing module 105 issues an exclusiveness request to the PED 107. As a result, the PED 107 does not accept an exclusiveness request even if it is thereafter sent from another module until the exclusive state is canceled.

From this time onward, if a print command flows into the legacy path, the print command is stored in the buffer 133 and processing is performed according to the print command. For example, the legacy language processing module 105 requests the data acquisition module 103 to send data (S31-1). The data acquisition module 103 reads data (e.g., data of a prescribed size (e.g., 1 byte)) from an auxiliary buffer 134 (e.g., a buffer having a smaller capacity than the buffer 133) and passes the read-out data to the legacy language processing module 105 (S31-4). The legacy language processing module 105 sends the PED 107 a command that is based on the received data. Steps 31-1 and 31-4 are executed repeatedly. Steps 31-1 and 31-4 are executed by the method that was described above with reference to FIG. 15. Therefore, the data acquisition module 103 may have the auxiliary buffer 134 (e.g., a buffer having a capacity of 256 bytes). If the auxiliary buffer 134 does not have any data, the data acquisition module 103 can request the IFD 101 to send data (S31-2) and the IFD 101 can acquire data from the buffer 133 and passes the acquired data to the data acquisition module 103 (S31-3).

The legacy language processing module 105 analyzes the command that was acquired at step S31-4 and performs processing on the basis of an analysis result. For example, the legacy language processing module 105 communicates the specification information (described above) to the host apparatus 1 and executes steps A-E shown in FIG. 12 until detecting a particular mode transition command.

Even while steps 31-1 and 31-4 are being executed, a print command that flows into the legacy path is stored in the buffer 133. The same is true of a case that a print command written in the particular language rather than the legacy language flows into the legacy path. Steps S31-1 to S31-4 are executed as shown in FIG. 17 (S32-1 to S32-4) until the legacy language processing module 105 detects a prescribed command (e.g., legacy job end command or particular mode transition command).

If detecting a particular mode transition command at step S32-4, the legacy language processing module 105 calls a third API of the IF harness 303 and informs the IF harness 303 of a start of printing of an RGB image (S33). That is, processing for switching from the legacy path to an RGB print path is started. An alternative procedure is such that the data acquisition module 103 receives a prescribed notice from the legacy language processing module 105 and, in response, calls the third API of the IF harness 303 and informs the IF harness 303 of a start of printing of an RGB image. Being an API that is called in response to detection of a command, the third API may have a structure similar to the structure of the first API.

When receiving the RGB image print start notice, the IF harness 303 may execute steps (i.e., steps S34 and S37) that are substantially the same as steps S25 and S28 shown in FIG. 16.

More specifically, the IF harness 303 issues, to the DPC 131, an ID of print processing and a request (e.g., "LockProcess-RGBPrintPath") for securing modules to constitute a print path for the print processing (S34). Since the IF harness 303 has received the RGB image print start notice, it communicates "particular language mode printing" to the DPC 131 as the print processing ID.

The DPC 131 starts to construct an RGB print path because it has received "particular language mode printing" as the print processing ID. The DPC 131 employs the particular language processing module 113 (initiator module I-A), the color conversion/halftoning module 115 (member module M-E), the interlace processing module 117 (member module M-H), and the print processing module 119 (terminator module T-A) as modules to constitute an RGB print path on the basis of the information shown in FIG. 13C, and calls each of those modules using a G-GREEN function (S35 and S36).

Then, the IF harness 303 requests the DPC 131 to perform print processing (e.g., "StartProcess-RGBPrintPath") (S37). In response to the request, the DPC 131 sends a START-J function to the modules 113, 115, 117, and 119 (S38 and S39). Receiving the START-J function, the modules 113, 115, 117, and 119 make a transition from the "ready" status to the "processing" status. An RGB print path is thus constructed. At this time, the print processing module 119 does not issue an exclusiveness request to the PED 107 unlike the initiator of the legacy path and, instead, sends data to the PED 107. This is because the data are accepted by the PED 107 even if the print processing module 119 does not issue an exclusiveness request (because the PED 107 has already been secured by the construction of the legacy path), and the PED 107 would not accept an exclusiveness request even if the print processing module 119 bothered to issue an exclusiveness request (because as mentioned above the PED 107 has already been secured by the other initiator module).

In this embodiment, the DPC 131 communicates information (information of a data processing path) indicating a print path (e.g., legacy path or RGB print path) to each of modules to constitute the print path with timing of starting to construct the print path (in other words, timing with which an API (G-READY, START-J, or the like) of each module is called by the DPC 131). More specifically, for example, the DPC 131 calls an API with the print path information set for an argument of the API. For example, the print path information may be the ID of one of the upstream module and the downstream module closest to a module to which the print path information is to be provided.

When the execution of step S39 has completed, construction of an RGB print path as a switching destination from the legacy path is finished. In the process of FIGS. 16-18, an RGB print path is constructed when the printer 15 detects a particular mode transition command.

Once an RGB print path is constructed, it becomes possible to perform particular mode processing (described above; in other words, steps G-M shown in FIG. 12) as indicated by a broken-like frame 703 in FIG. 17. In the particular mode, in the exemplary process of FIGS. 16-18, the initiator module (i.e., particular language processing module 113) of the RGB print path receives data from the terminator module (i.e., legacy language processing module 105) and causes the data to flow downstream. More specifically, for example, the particular language processing module 113 requests the legacy language processing module 105 to send data (S40). The legacy language processing module 105 requests the data acquisition module 103 to send data (S41-1). In response, the data acquisition module 103 reads data (command) from the auxiliary buffer 134 and passes the read-out data to the legacy language processing module 105 (S41-4). If necessary, the same processing as performed at steps S31-2 and S31-3 shown in FIG. 16 is performed (S41-2 and S41-3). The legacy language processing module 105 passes, to the particular language processing module 113, the data received from the data acquisition module 103 (S42). The particular language processing module 113 analyzes the received data (command written in the particular language) and performs processing according to the command. If the received data are RGB data, the particular language processing module 113 causes the acquired RGB data to flow to the downstream module (S43). The RGB data are subjected to the color conversion, halftoning, interlacing, etc. in the member modules 115 and 117. The print processing module 119 generates a control command for the PED 107 on the basis of the thus-processed RGB data, and the generated control command is sent to the PED 107 (S44).

To enable data exchange between the legacy language processing module 105 and the particular language processing module 113, the modules 105 and 113 may be configured substantially in the same manner as the member modules (i.e., provided with both of a function for the upstream module and a function for the downstream module) though they are a terminator module and an initiator module, respectively.

As described above, when the particular mode has been established, the legacy language processing module 105 causes an acquired command to flow to the particular language processing module 113 without analyzing the command at all. Therefore, even if the legacy language processing module 105 receives, during the particular mode, a legacy transition command which means cancellation of the particular mode, the legacy language processing module 105 does not detect it and causes it to flow to the particular language processing module 113. The particular language processing module 113 detects the legacy transition command. Alternatively, the legacy transition command may be allowed to flow downstream further and detected by at least one of the downstream modules 115, 117, and 119. As a further alternative, the legacy transition command may be detected sequentially as it flows downstream. Modules that have detected the cancellation of the particular mode (e.g., modules 113, 115, 117, and 119) issue a particular mode cancellation notice (e.g., "EndJob") to the DPC 131, for example, in order of times of detection of the cancellation (S45 and S46). In this case, each of the modules 113, 115, 117, and 119 can make a transition from the "processing" status to the "ready" status.

When receiving the particular mode cancellation notice from each module, the DPC 131 calls a fourth API of the IF harness 303 and issues a processing request (e.g., "StartProcess-RGBPrintPath-Callback") for cancellation of the particular mode to the ID harness 303 (S47).

The IF harness 303 has been kept in a standby state from the instant when it requested the performance of the print processing at step S37 to the instant when it is called. If the IF harness 303 receives the processing request for cancellation of the particular mode while it is in the standby state, the IF harness 303 calls a prescribed API of the DPC 131 and issues a request for particular mode cancellation processing (e.g., "ReleaseProcess-RGBPrintPath" to the DPC 131 (S48). In response to the request, the DPC 131 issues cancellation requests (e.g., "CancelReady") to the modules 113, 115, 117, and 119 constituting the RGB print path (S49 and S50). These cancellation requests may be issued in the same order as the particular mode cancellation notices were received. In response to the requests, the modules 113, 115, 117, and 119 can make a transition from the "ready" status to the "standby" status. As a result, the RGB print path is canceled; in other words, no RGB print path remains.

The IF harness 303 issues a particular mode cancellation notice to the legacy language processing module 105 (S51). From the time of reception of the particular mode cancellation notice onward, the legacy language processing module 105 again analyzes data (command) received from the data acquisition module 103. That is, for example, the same processing as performed at steps S31-1 to S31-4 shown in FIG. 16 is performed (S52-1 to S52-4).

If the auxiliary buffer 134 has become empty, the data acquisition module 103 requests the IFD 101 to send data. However, if the buffer 133 is also empty, no data are sent to the data acquisition module 103 (e.g., a notice indicating that the buffer 133 is empty is sent from the IFD 101 to the data acquisition module 103).

In this case, the legacy path is also canceled to establish a state that no legacy path exists in the printer 15. More specifically, for example, the fact that the buffer 133 has become empty is detected first by the data acquisition module 103 and a legacy mode cancellation notice (e.g., "EndJob") is sent from the data acquisition module 103 to the DPC 131 (S53). Then, the data acquisition module 103 informs the legacy language processing module 105 of the fact that the buffer 133 has become empty, whereby the legacy language processing module 105 detects that fact. A legacy mode cancellation notice (e.g., "EndJob") is sent from the legacy language processing module 105 to the DPC 131 (S54).

When receiving the legacy mode cancellation notice from all the modules 103 and 105 constituting the legacy path, the DPC 131 calls a fifth API of the IF harness 303 and issues a processing request for cancellation of the legacy mode (e.g., "StartProcess-LegacyPath-Callback") to the IF harness 303 (S55). In this case, each of the modules 103 and 105 can make a transition from the "processing" status to the "ready" status.

When receiving the processing request for cancellation of the legacy mode, the IF harness 303 calls a prescribed API of the DPC 131 and issues a request for legacy mode cancellation processing (e.g., "ReleaseProcess-LegacyPath") to the DPC 131 (S56). In response to the request, the DPC 131 issues cancellation requests (e.g., "CancelReady") to the modules 103 and 105 constituting the legacy path, for example, in the same order as the legacy mode cancellation notices were received (S57 and S58). In response to the requests, the modules 103 and 105 can make a transition from the "ready" status to the "standby" status. As a result, the legacy path is canceled; in other words, no legacy path remains.

Finally, the IF harness 303 issues a print end notice to the service 323 (S59). As a result, the service 323 cancels the exclusive state and comes to be able to accept a print processing request. For example, the service 323 does not accept another print processing request (e.g., direct printing request) even if it is sent from another harness until reception of the print end notice. Once the print end notice is received, the service 323 can accept a new print processing request.

In the above-described embodiment, at first, the printer 15 allows every type of data received from the host apparatus 1 to flow through a legacy path (the type of data is irrelevant). If it is detected at a particular position on the legacy path that the data are of a particular type, the data of the particular type are transferred to and processed in another print path for processing the data of the particular type. This makes it possible to provide functions for processing data of a particular type without the need for large design alterations such as changes in the configuration of the legacy path itself.

Incidentally, several modifications to the embodiment are possible. Those modifications will be described below.

(1) First Modification

FIG. 19 shows the configuration of an exemplary printer driver according to a first modification to the embodiment of the invention. FIG. 20 shows the configuration of an exemplary print path in a printer that receives data from the printer driver of FIG. 19.

The first modification relates to another example in which a legacy path and a path for processing RGB data are used simultaneously. More specifically, in the first modification, RGB data that are transmitted from the printer driver 21 can be RGB data of XHTM-Print (MIME multiplexed).

However, for the following reasons, it is not preferable to simply replace RGB data with RGB data of XHTM-Print. First, in XHTM-Print, since an image is referred to as a subject of processing, the printer 15 reads the image separately from the host apparatus 1. Therefore, the printer 15 should have ability of performing a bidirectional communication; that is, printers incapable of performing a bidirectional communication perform processing of XHTML-Print. Second, the data size of an image as a subject of processing may be large, in which case reading from the host apparatus 1 may take long time to cause a slow print speed.

In view of the above, in the first modification, as shown in FIG. 19, the printer driver 21 is provided with a packing processing section 390. An image to be referred to is also packed (encoded) by the processing section 390 and a command relating to XHTML-Print is sent to the printer 15 in the form of stream data. The printer 15 allows the stream data to flow through a legacy path. If a command relating to XHTML-Print is detected at a particular position on the legacy path (e.g., legacy language processing module 105), the DPC 131 constructs an RGB print path for processing commands relating to XHTML-Print. For example, the RGB print path is different from the above-described RGB print path in having a MIME processing module 441 which performs processing relating to MIME (multipurpose Internet mail extension) and an XHTML-Print print processing module 443 which performs processing (e.g., decoding) relating to XHTML-Print.

(2) Second Modification

In a state that only a legacy path is constructed, the printer 15 (e.g., its service 323) may construct an RGB path (e.g., a print path for direct printing) that is different from an RGB print path for processing RGB data that are sent from the host apparatus 1. In this case, the PED 107 cannot eject sheets because it is reserved from the legacy path and hence is in an exclusive state. However, the following processing is possible. RGB data are processed to a state immediately before printing (e.g., to a state of completion of interlace processing) and stored in the printer storage area 33 (temporary storage). After cancellation of the legacy path, the stored data are read and printed.

(3) Third Modification

When receiving certain data from the host apparatus 1, the printer 15 constructs a legacy path. An RGB print path may also be constructed at this time (e.g., with (substantially) the same timing as the legacy path is constructed).

(4) Fourth Modification

A configuration is possible in which the auxiliary buffer 134 is omitted and data read from the buffer 133 are received by the legacy language processing module 105. In this case, once a particular mode transition command is read and an RGB print path is constructed, the particular language processing module 113 may acquire subsequent data directly from the buffer 133. If the particular language processing module 113 has come to acquire data directly from the buffer 133, the printer 15 may cancel the legacy path until detecting a prescribed event (e.g., until the particular language processing module 113 detects cancellation of the particular mode). The printer 15 may construct a legacy path again when detecting such an event.

The preferred embodiment and the several modifications of the invention have been described above. However, they are just examples for description of the invention and it is not intended to restrict the scope of the invention to them. The invention can be practiced in other various forms. For example, a printing system is possible in which the host apparatus 1 and the printer 15 are connected to each other via a communication network such as the Internet and the printer 15 transmits a device ID and specification information via the communication network. Further, the following configuration is possible. A user sets, in the printer 15, through a user interface such as the operating panel of the printer 15 or the printer driver 21, to what level of the priority order stored in the printer the user can accept. When caused to change parameters relating to print conditions that are higher than the thus-set priority level, the printer 15 transmits, to the printer driver 21, information indicating that printing cannot be performed (information indicating that printing is enabled if a user sets those parameters may be added).

What is claimed is:

1. A printer, comprising:
a legacy path that is a data processing path along which data written in a legacy language flows, the legacy path being a data processing path along which all input data flows regardless of a type of the input data;
another data processing path that is a data processing path in which data of a particular type is processed; and
a judging section that judges whether data input into the legacy path is data written in the legacy language or data of the particular type,
wherein the judging section interprets the input data, if judged that the input data is the data written in the legacy language, and
wherein the judging section passes the input data to the another data processing path, if judged that the input data is the data of the particular type.

2. The printer according to claim 1, wherein the data of the particular type is RGB image data, which is image data of a RGB colorimetric system, and
wherein the another data processing path is an RGB print path along which the RGB image data flows.

3. The printer according to claim 1, wherein the another data processing path is not constructed until the judging section judges that data input into the legacy path is data of particular type, and
wherein the printer further comprises a constructing section that constructs the another data processing path if the judging section judges that data input into the legacy path is the data of the particular type.

4. The printer according to claim 1, wherein the judging section passes data, which is input after judging that data input into the legacy path is the data of the particular type, to the another data processing path, without performing the judgment.

5. The printer according to claim 1, further comprising a releasing section that releases the another data processing path and then, if input of data is not detected, then releases the legacy path.

6. The printer according to claim 1, further comprising a storing section that stores a plurality of program modules capable of being components of a data processing path,
wherein each of the legacy path and the another data processing path is formed by two or more program modules selected from the plurality of program modules and includes at least an initiator module located at a head and a terminator module located at an end.

7. The printer according to claim 1, further comprising:
a first constructing section that constructs the legacy path, if receiving input of data without the negotiation, and
a second constructing section that constructs the another data processing path, if receiving input of data with the negotiation.

* * * * *